US011235387B2

(12) United States Patent
Mori et al.

(10) Patent No.: US 11,235,387 B2
(45) Date of Patent: Feb. 1, 2022

(54) WORKPIECE PROCESSING METHOD

(71) Applicant: DMG MORI CO., LTD., Yamatokoriyama (JP)

(72) Inventors: Masahiko Mori, Yamatokoriyama (JP); Yuhei Mezawa, Yamatokoriyama (JP); Shigeyuki Takashima, Yamatokoriyama (JP); Shigetsugu Sakai, Yamatokoriyama (JP); Makoto Fujishima, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 483 days.

(21) Appl. No.: 15/559,149

(22) PCT Filed: Mar. 7, 2016

(86) PCT No.: PCT/JP2016/056951
§ 371 (c)(1),
(2) Date: Sep. 18, 2017

(87) PCT Pub. No.: WO2016/152478
PCT Pub. Date: Sep. 29, 2016

(65) Prior Publication Data
US 2018/0065181 A1    Mar. 8, 2018

(30) Foreign Application Priority Data
Mar. 20, 2015 (JP) .............................. JP2015-057180

(51) Int. Cl.
*B22F 10/20* (2021.01)
*B22F 3/105* (2006.01)
(Continued)

(52) U.S. Cl.
CPC ................ *B22F 3/105* (2013.01); *B22F 3/16* (2013.01); *B22F 3/162* (2013.01); *B22F 10/20* (2021.01);
(Continued)

(58) Field of Classification Search
None
See application file for complete search history.

(56) References Cited

U.S. PATENT DOCUMENTS 4,621,398 A * 11/1986 Kleiman ............. B05B 13/0431
29/264
7,020,539 B1 * 3/2006 Kovacevic ............ B22F 3/1055
700/166
(Continued)

FOREIGN PATENT DOCUMENTS

CN          203818557 U     9/2014
CN          104174939 A    12/2014
(Continued)

OTHER PUBLICATIONS

International Search Report dated Apr. 19, 2016 in PCT/JP2016/056951 filed Mar. 7, 2016.
(Continued)

*Primary Examiner* — Patricia L. Hailey
*Assistant Examiner* — Christopher D. Moody
(74) *Attorney, Agent, or Firm* — Oblon, McClelland, Maier & Neustadt, L.L.P.

(57) ABSTRACT

A workpiece processing method is a method for successively processing a plurality of workpieces including a first workpiece and a second workpiece in a single machining area. The workpiece processing method includes: performing additive manufacturing on the second workpiece in the machining area; and performing subtractive manufacturing on the first workpiece in the machining area while keeping
(Continued)

on standby the second workpiece on which additive manufacturing is performed. In this way, the workpiece processing method with improved productivity is provided.

12 Claims, 26 Drawing Sheets

(51) Int. Cl.
| | |
|---|---|
| B22F 3/16 | (2006.01) |
| B23B 11/00 | (2006.01) |
| B23K 26/00 | (2014.01) |
| B23K 26/144 | (2014.01) |
| B23K 26/342 | (2014.01) |
| B23P 23/04 | (2006.01) |
| B23P 23/06 | (2006.01) |
| B29C 64/30 | (2017.01) |
| B33Y 10/00 | (2015.01) |
| B33Y 40/00 | (2020.01) |
| B23B 1/00 | (2006.01) |
| B23B 3/30 | (2006.01) |
| B23P 15/00 | (2006.01) |
| B28B 1/32 | (2006.01) |
| B22F 3/24 | (2006.01) |
| B29C 64/106 | (2017.01) |

(52) U.S. Cl.
CPC .............. *B23B 1/00* (2013.01); *B23B 3/30* (2013.01); *B23B 11/00* (2013.01); *B23K 26/0093* (2013.01); *B23K 26/144* (2015.10); *B23K 26/342* (2015.10); *B23P 15/00* (2013.01); *B23P 23/04* (2013.01); *B23P 23/06* (2013.01); *B28B 1/32* (2013.01); *B29C 64/30* (2017.08); *B33Y 10/00* (2014.12); *B33Y 40/00* (2014.12); *B22F 2003/247* (2013.01); *B29C 64/106* (2017.08); *Y02P 10/25* (2015.11)

(56) References Cited

U.S. PATENT DOCUMENTS

| | | | |
|---|---|---|---|
| 7,777,155 B2* | 8/2010 | Twelves, Jr. | B23P 21/004 |
| | | | 219/121.86 |
| 2011/0285060 A1* | 11/2011 | Yamamoto | B29C 64/153 |
| | | | 264/401 |
| 2013/0015596 A1* | 1/2013 | Mozeika | B25J 9/0084 |
| | | | 264/40.1 |
| 2016/0031010 A1* | 2/2016 | O'Neill | B22F 3/1055 |
| | | | 419/28 |
| 2016/0052057 A1* | 2/2016 | Xu | F01D 5/187 |
| | | | 419/5 |
| 2016/0279875 A1* | 9/2016 | Tiezzi | B27M 1/08 |
| 2017/0136545 A1* | 5/2017 | Yoshimura | B29C 64/20 |
| 2017/0282457 A1* | 10/2017 | Burns | B33Y 10/00 |
| 2018/0029803 A1* | 2/2018 | Buschmann | G05B 19/4189 |
| 2018/0065208 A1* | 3/2018 | Mori | B23B 3/22 |

FOREIGN PATENT DOCUMENTS

| | | |
|---|---|---|
| CN | 104228051 A | 12/2014 |
| JP | 2004-314168 A | 11/2004 |
| JP | 2012-206137 A | 10/2012 |

OTHER PUBLICATIONS

Chén Dé Zhōng, "Observations on DMC2014 Numerical Control Special machine Tools", World Manufacturing Engineering & Market, 2015, year 01 issue, pp. 81-85 (with partial English translation).

* cited by examiner

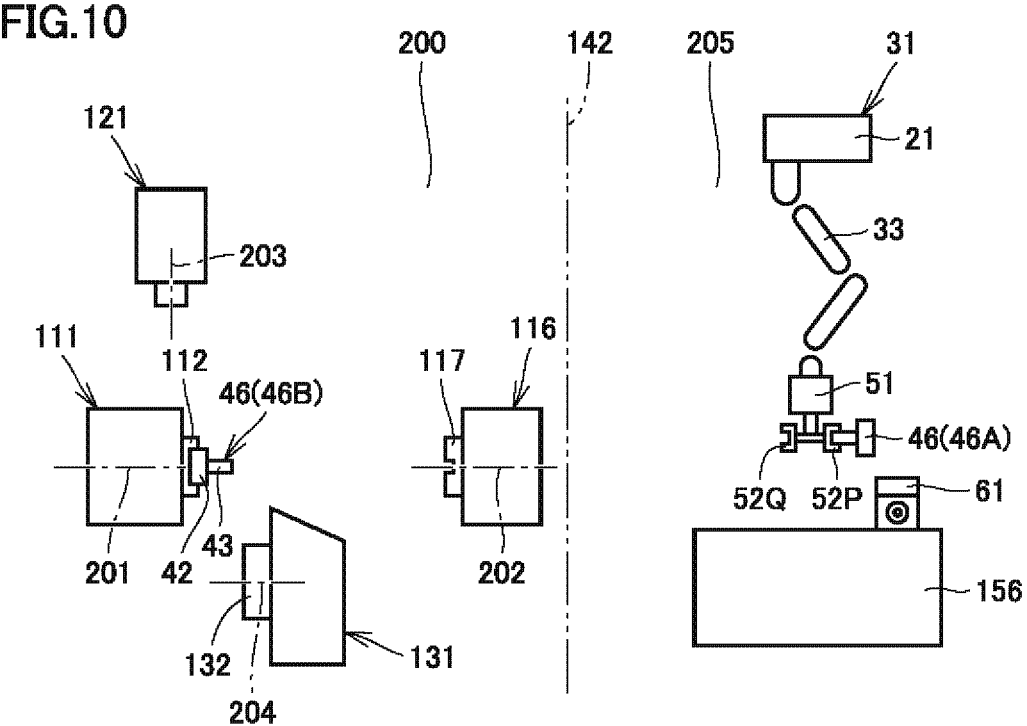
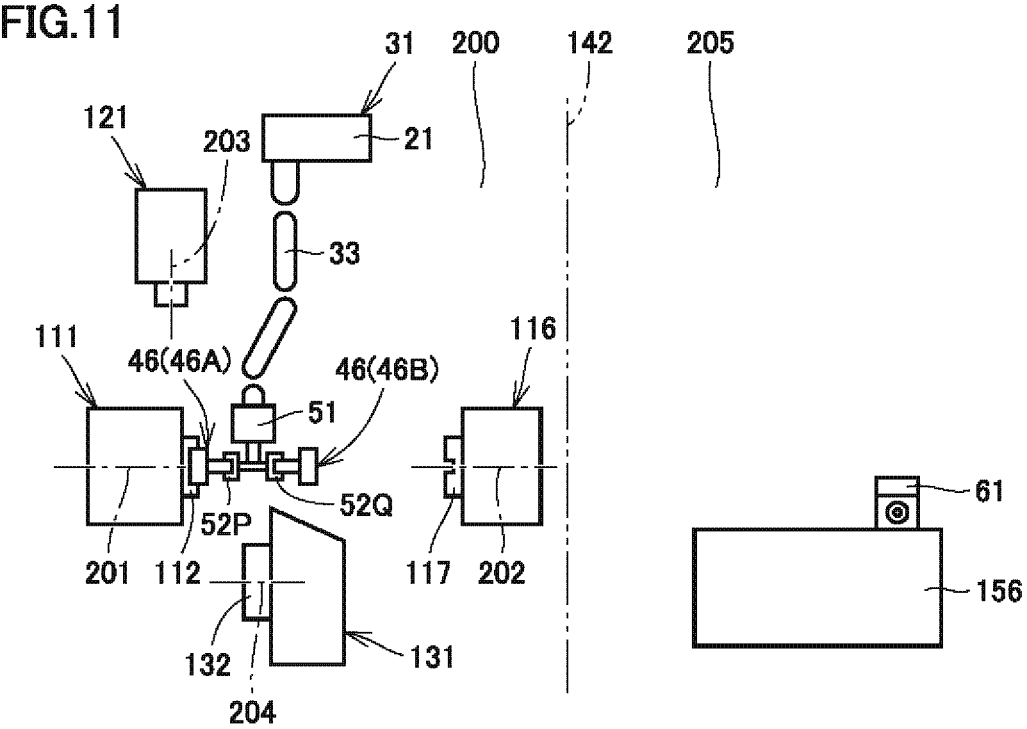

FIG.16

|  | MACHINING AREA | EXTERNAL AREA |
|---|---|---|
| STEP a | INTERMEDIATE PRODUCT 46A (ADDITIVE MANUFACTURING) |  |
| STEP b | INTERMEDIATE PRODUCT 46B (ADDITIVE MANUFACTURING) | INTERMEDIATE PRODUCT 46A (COOLING) |
| STEP c | INTERMEDIATE PRODUCT 46A (SUBTRACTIVE MANUFACTURING) | INTERMEDIATE PRODUCT 46B (COOLING) |
| STEP d | INTERMEDIATE PRODUCT 46C (ADDITIVE MANUFACTURING) | INTERMEDIATE PRODUCT 46B (COOLING) |
| STEP e | INTERMEDIATE PRODUCT 46B (SUBTRACTIVE MANUFACTURING) | INTERMEDIATE PRODUCT 46C (COOLING) |

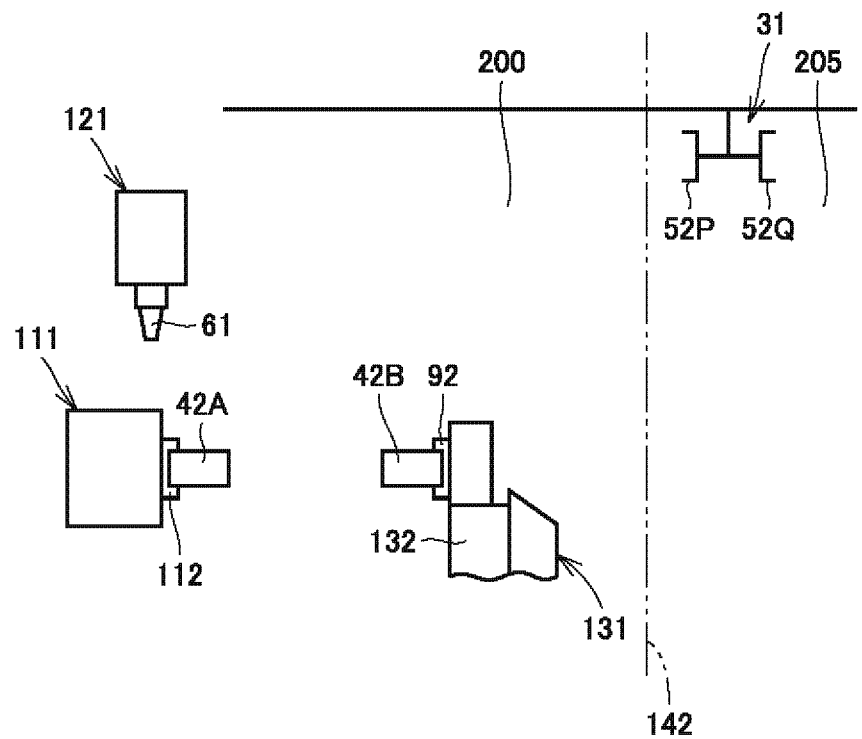

FIG.17

WORKPIECE PROCESSING METHOD

TECHNICAL FIELD

The present invention generally relates to a workpiece processing method, and more particularly relates to a method for successively processing a plurality of workpieces by additive manufacturing and subtractive manufacturing within a single machining area.

BACKGROUND ART

Regarding conventional manufacturing machines, Japanese Patent Laying-Open No. 2004-314168 for example discloses a laser cladding apparatus for pump devices with the purpose of fast and accurate cladding without causing cracks in a base material (Patent Document 1). The laser cladding apparatus disclosed in Patent Document 1 includes a powder feeder feeding a metal material (powder) by means of argon gas as a carrier gas, a vortex-type powder feed nozzle uniformly mixing the fed metal material with the argon gas and simultaneously using a gas mixture of argon and nitrogen as a shield gas, and a multi-axis robot moving the vortex-type power feed nozzle.

Japanese Patent Laying-Open No. 2012-206137 discloses a repair apparatus with the purpose of easily performing cladding welding without human labor (Patent Document 2). The repair apparatus disclosed in Patent Document 2 includes a material feeding unit, a laser apparatus emitting a laser spot beam, and a welding robot having a multi-joint arm for moving the laser spot beam in three-dimensional directions.

CITATION LIST

Patent Document

PTD 1: Japanese Patent Laying-Open No. 2004-314168
PTD 2: Japanese Patent Laying-Open No. 2012-206137

SUMMARY OF INVENTION

Technical Problem

Additive manufacturing is a process of creating a three-dimensional shape by depositing materials onto a workpiece. In contrast, subtractive manufacturing is a process of creating a three-dimensional shape from a workpiece by removing materials from the workpiece. The mass of the workpiece has been increased after additive manufacturing, while the mass of the workpiece has been decreased after subtractive manufacturing. The additive and subtractive manufacturing processes are performed in combination in such a manner that takes respective advantages of these processes to produce the final shape of the workpiece.

When a workpiece is processed by successively performing additive manufacturing and subtractive manufacturing, however, a material deposited on the workpiece has to be cooled to be hardened after additive manufacturing. It is therefore impossible to immediately switch the process from additive manufacturing to subtractive manufacturing. The whole processing time from the start to the end of workpiece processing thus increases, possibly leading to deterioration of the productivity of the workpiece processing.

An object of the present invention is therefore to solve the above problems and provide a workpiece processing method with the productivity improved.

Solution to Problem

A workpiece processing method according to the present invention is a method for successively processing a plurality of workpieces including a first workpiece and a second workpiece in a single machining area. The workpiece processing method includes: performing additive manufacturing on the second workpiece in the machining area; and performing subtractive manufacturing on the first workpiece in the machining area while keeping on standby the second workpiece on which additive manufacturing is performed.

Advantageous Effects of Invention

According to the present invention, a workpiece processing method with the improved productivity can be provided.

BRIEF DESCRIPTION OF DRAWINGS

FIG. 10 is a diagram schematically showing a fourth step of the workpiece processing method in the first embodiment of the present invention.

FIG. 11 is a diagram schematically showing a fifth step of the workpiece processing method in the first embodiment of the present invention.

FIG. 16 is a diagram showing a flow of steps of a workpiece processing method in the first embodiment of the present invention.

FIG. 17 is a diagram schematically showing a first step of a workpiece processing method in a second embodiment of the present invention.

DESCRIPTION OF EMBODIMENTS

Figure 1:
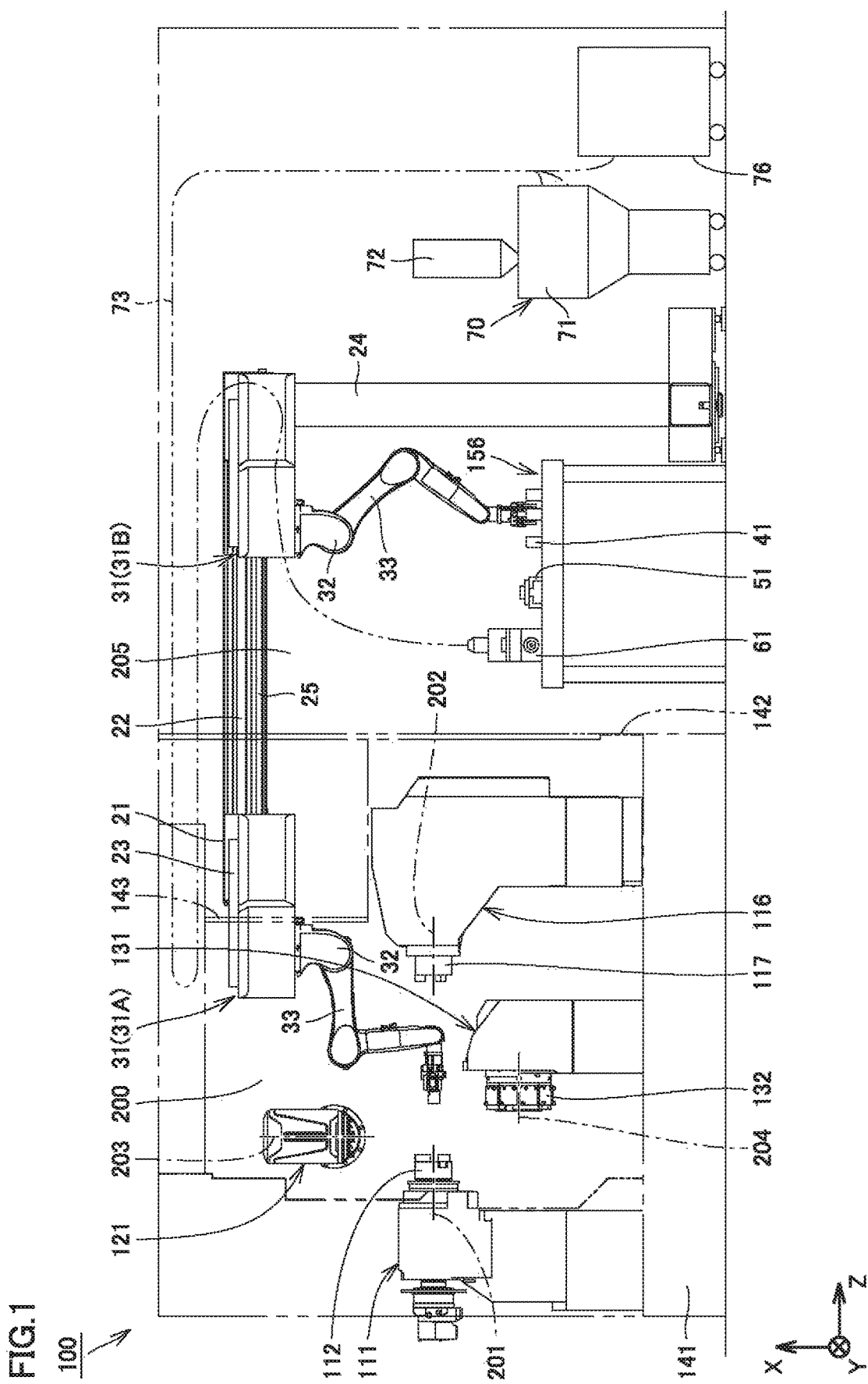
FIG. 1 is a front view showing a manufacturing machine used for a workpiece processing method in a first embodiment of the present invention.

Embodiments of the present invention will be described with reference to the drawings. In the drawings referenced below, the same or corresponding members are denoted by the same numerals.

First Embodiment

FIG. 1 is a front view showing a manufacturing machine used for a workpiece processing method in a first embodiment of the present invention. In FIG. 1, a cover body presenting the appearance of the manufacturing machine is shown as if it is transparent, so that the inside of the manufacturing machine is visible.

Referring to FIG. 1, manufacturing machine 100 is an AM/SM hybrid manufacturing machine capable of additive manufacturing (AM) for a workpiece and subtractive manufacturing (SM) for a workpiece. Manufacturing machine 100 has a turning function performed by means of a stationary tool and a milling function performed by means of a rotary tool, as functions of SM.

First, a description is given of the overall structure of manufacturing machine 100. Manufacturing machine 100 includes a bed 141, a first headstock 111, a second headstock 116, a tool spindle 121, and a lower tool rest 131.

Bed 141 is a base member for supporting first headstock 111, second headstock 116, tool spindle 121, and lower tool rest 131, and mounted on an installation surface in a factory or the like.

First headstock 111 and second headstock 116 are provided to face each other in a z-axis direction extending horizontally. First headstock 111 and second headstock 116 have a spindle 112 and a spindle 117, respectively, for rotating a workpiece in a turning process performed by means of a stationary tool. Spindle 112 is provided rotatably about a central axis 201 extending in parallel with the z axis. Spindle 117 is provided rotatably about a central axis 202 extending in parallel with the z axis. Spindle 112 and spindle 117 are each provided with a chuck mechanism for detachably holding a workpiece.

Tool spindle (upper tool rest) 121 causes a rotary tool to rotate in a milling process performed by means of the rotary tool. Tool spindle 121 is provided rotatably about a central axis 203 extending in parallel with an x axis that extends vertically. Tool spindle 121 is provided with a clamp mechanism for detachably holding the rotary tool.

Tool spindle 121 is supported above bed 141 through a column or the like (not shown). Tool spindle 121 is provided to be movable, by any of various feed mechanisms, guide mechanisms, a servo motor, and the like provided on the column or the like, in the x-axis direction, a y-axis direction extending horizontally and orthogonally to the z-axis direction, and the z-axis direction. The position of machining by the rotary tool attached to tool spindle 121 moves three-dimensionally. Further, tool spindle 121 is provided to be swivelable about a central axis extending in parallel with the y axis.

Although not shown in FIG. 1, an automatic tool-change device for automatically changing a tool attached to tool spindle 121 and a tool magazine storing replacement tools to be attached to tool spindle 121 are provided around first headstock 111.

To lower tool rest 131, a plurality of stationary tools for turning are attached. Lower tool rest 131 has a so-called turret shape, and a plurality of stationary tools are attached radially to lower tool rest 131. Lower tool rest 131 is provided for swivel indexing.

More specifically, lower tool rest 131 includes a swivel unit 132. Swivel unit 132 is provided to be swivelable about a central axis 204 extending in parallel with the z axis. At positions (10 positions in the present embodiment) located at intervals in the direction of the circumference centered at central axis 204, tool holders for holding stationary tools are attached. Swivel unit 132 swivels about central axis 204 to thereby circumferentially move the stationary tools held by the tool holders, and a stationary tool to be used for turning is indexed.

Lower tool rest 131 is supported above bed 141 through a saddle or the like (not shown). Lower tool rest 131 is provided to be movable in the x-axis direction and the z-axis direction by any of various feed mechanisms, guide mechanisms, a servo motor, and the like provided on the saddle or the like.

Manufacturing machine 100 further includes a side cover 142. Side cover 142 is disposed opposite to first headstock 111 with respect to second headstock 116. Side cover 142 separates a machining area 200 and an external area 205 from each other. In machining area 200, first headstock 111, second headstock 116, tool spindle 121, and lower tool rest 131 are arranged. Side cover 142 is equipped with an openable/closeable shutter 143.

Figure 2:
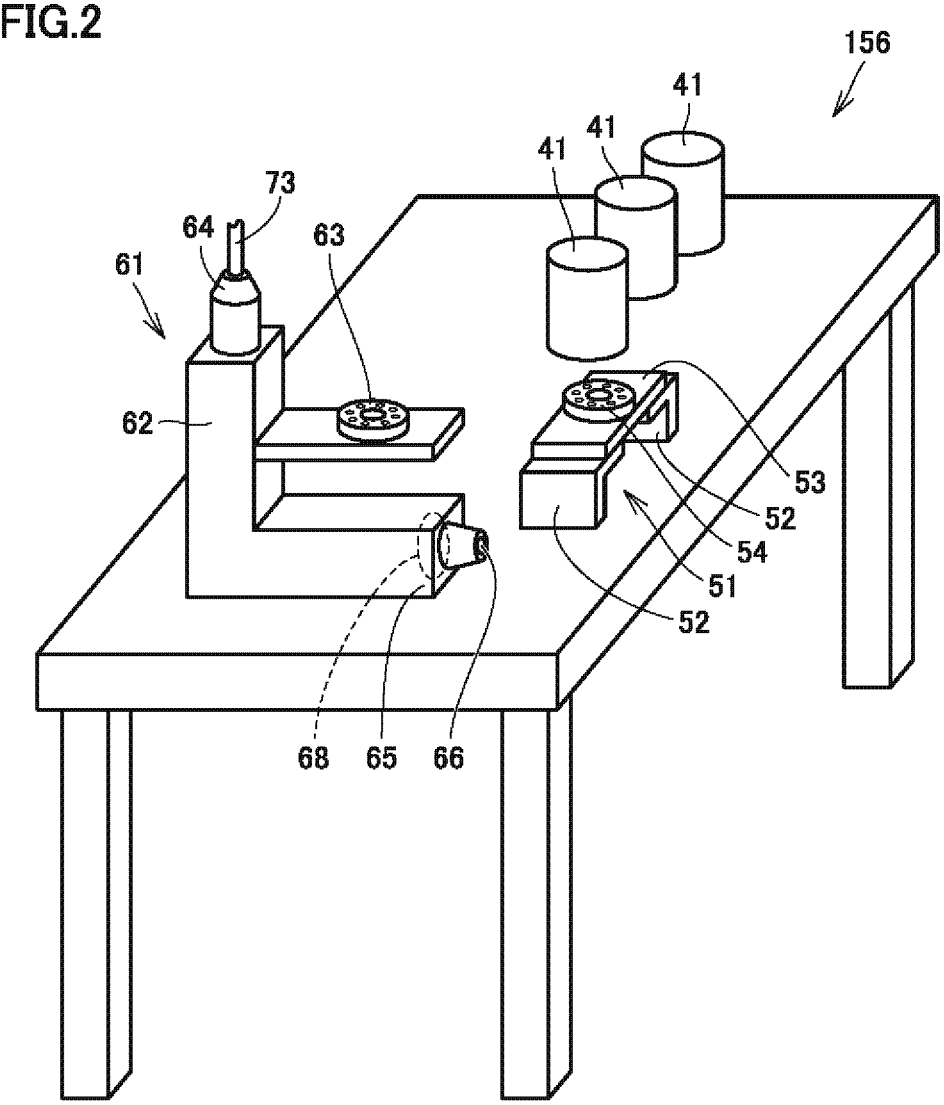
FIG. 2 is a perspective view showing workpieces, a workpiece gripper, and an additive manufacturing head that are stored at a stocker in the manufacturing machine in FIG. 1.

FIG. 2 is a perspective view showing workpieces, a workpiece gripper, and an additive manufacturing head that are stored at a stocker in the manufacturing machine in FIG. 1. Referring to FIGS. 1 and 2, manufacturing machine 100 further includes a stocker 156, a workpiece gripper 51, and an additive manufacturing head 61.

Stocker 156 is disposed in external area 205. Stocker 156 is provided in the form of a table capable of storing workpiece 41, workpiece gripper 51, and additive manufacturing head 61. Stocker 156 is not particularly limited and may be any that can store workpieces 41, workpiece gripper 51, and additive manufacturing head 61. Stocker 156 may for example be a wagon having wheels, or a shelf.

Workpiece gripper 51 grips a workpiece while the workpiece is transported between machining area 200 and external area 205. Workpiece gripper 51 shown in FIG. 2 is a single-arm type gripper capable of gripping one workpiece at a time. Additive-manufacturing head 61 performs additive manufacturing by discharging material powder toward a workpiece and emitting a laser beam toward the workpiece (directed energy deposition).

Manufacturing machine 100 further includes a robot arm 31 on which additive manufacturing head 61 and workpiece gripper 51 are mountable. In the present embodiment, additive manufacturing head 61 and workpiece gripper 51 are configured to be detachably mounted on robot arm 31.

A structure of workpiece gripper 51 is specifically described. Workpiece gripper 51 includes a pair of gripper fingers 52, a base part 53, and a coupling part 54.

Coupling part 54 is provided as a coupling mechanism to join workpiece gripper 51 with a coupling part 36 of robot arm 31 as described later herein. Coupling part 54 is mounted on base part 53. Workpiece gripper 51 is configured to be detachably mounted on robot arm 31 by coupling part 54.

On base part 53, a pair of gripper fingers 52 is mounted. The pair of gripper fingers 52 is disposed opposite to coupling part 54 with respect to base part 53. Gripper fingers 52 of the pair are disposed to face each other, and moved toward each other to grip workpiece 41. Base part 53 supports the pair of gripper fingers 52 so that the fingers are slidable toward and away from each other.

A structure of additive manufacturing head 61 is specifically described. Additive manufacturing head 61 includes a main body 62, a laser beam emission part 65, a coupling part 63, and a connecting part 64.

Coupling part 63 is provided as a coupling mechanism to join additive manufacturing head 61 with coupling part 36 of robot arm 31 as described later herein. Coupling part 63 is mounted on main body 62. Additive manufacturing head 61 (main body 62) is configured to be detachably mounted on robot arm 31 by coupling part 63.

Main body 62 has a bent shape like an L-shape. On main body 62, laser beam emission part 65 and connecting part 64 are mounted. Laser beam emission part 65 is mounted on one end of L-shaped main body 62 and connecting part 64 is mounted on the other end thereof. Main body 62 houses elements such as collimation lens and reflection mirror for directing a laser beam from connecting part 64 toward laser beam emission part 65. In laser beam emission part 65, an opening 66 is formed, and the laser beam as well as material powder are emitted through opening 66. Laser beam emission part 65 houses an optical element 68. Optical element 68 is an element (such as condenser lens and mirror) for concentrating a laser beam onto a workpiece and defining a laser-beam-irradiated region on the workpiece. Opening 66 has an opening shape that allows a laser beam directed from optical element 68 toward a workpiece to pass through.

As shown in FIG. 1, manufacturing machine 100 further includes a material powder feeder 70, a laser oscillator 76, and a tube member 73. Material powder feeder 70 and laser oscillator 76 are disposed in external area 205. Material powder feeder 70 includes a material powder tank 72 for storing material powder to be used for additive manufacturing, and a mixing unit 71 for mixing the material powder with carrier gas. Laser oscillator 76 generates a laser beam to be used for additive manufacturing. Tube member 73 houses an optical fiber for directing the laser beam from laser oscillator 76 toward additive manufacturing head 61, and a pipe for directing the material powder supplied from material powder feeder 70 toward additive manufacturing head 61.

Tube member 73 is routed from material powder feeder 70 and laser oscillator 76 to additive manufacturing head 61, and has its end connected to connecting part 64 of additive manufacturing head 61. The material powder from material powder feeder 70 and the laser beam from laser oscillator 76 are introduced through tube member 73 into additive manufacturing head 61. A tube for feeding air is routed from an air source toward robot arm 31 (not shown).

Additive manufacturing to be performed by manufacturing machine 100 is not limited to the aforementioned directed energy deposition, and may for example be material extrusion by which a molten thermoplastic resin is deposited on a workpiece to produce a three-dimensional shape, or powder bed fusion by which heat is applied to selectively fuse and harden the powder bed around a surface of the powder bed and thereby form a layer.

Figure 3:
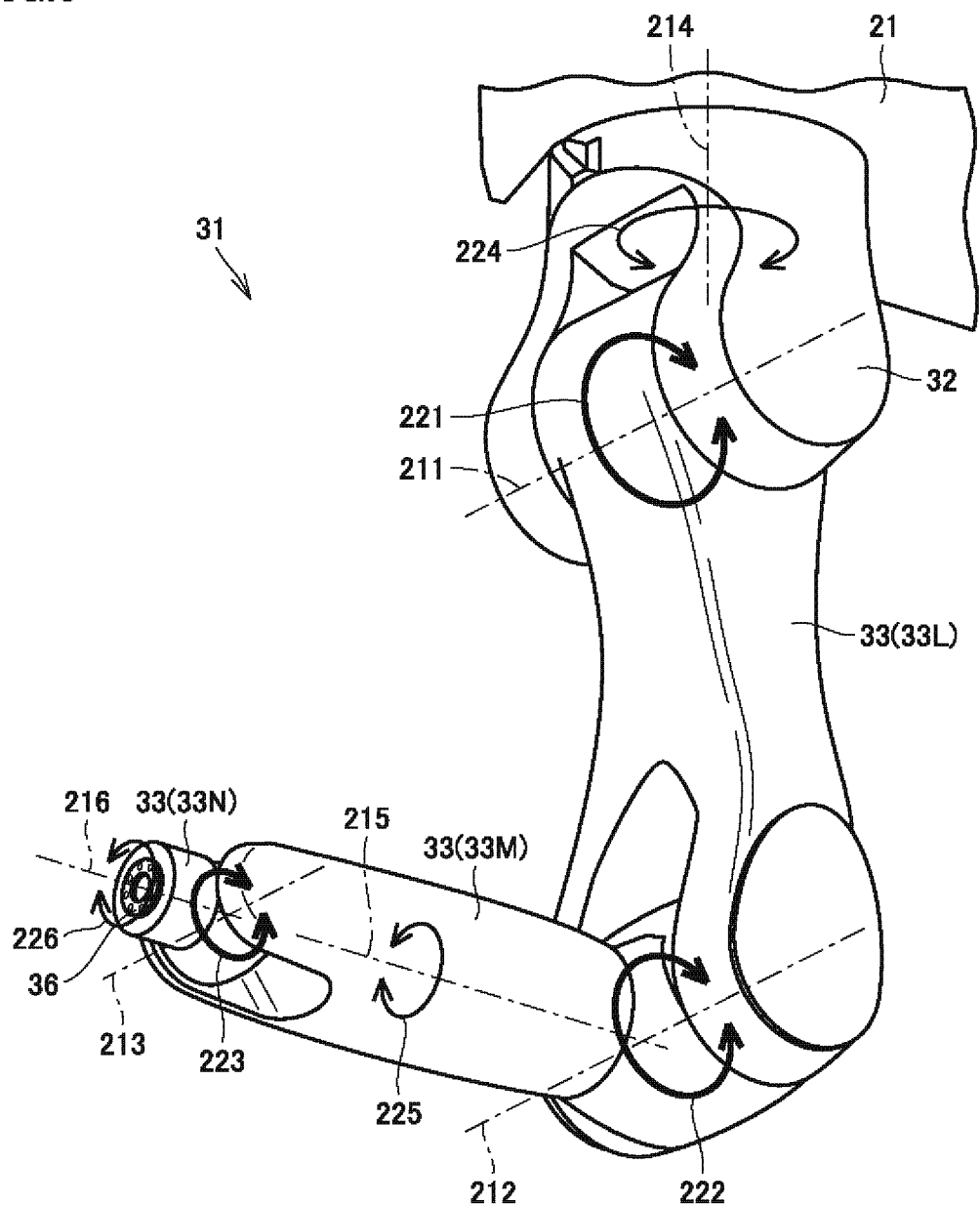
FIG. 3 is a perspective view showing a robot arm of the manufacturing machine in FIG. 1.

FIG. 3 is a perspective view showing a robot arm of the manufacturing machine in FIG. 1. Referring to FIGS. 1 to 3, a structure of robot arm 31 is specifically described. Robot arm 31 includes a movement mechanism 21, a base 32, an arm 33, and a coupling part 36.

Movement mechanism 21 is configured to be movable between machining area 200 and external area 205. Movement mechanism 21 causes robot arm 31 to move between a position 31A inside the machining area and a position 31B outside the machining area. Robot arm 31 is moved between position 31A inside the machining area and position 31B outside the machining area through opened shutter 143.

Movement mechanism 21 includes a mechanism for linearly reciprocating robot arm 31, and this mechanism includes a base member 23, a linear guide 22, a rack and pinion 25, a servo motor (not shown), and a support pillar 24.

Base member 23 is formed of a plate material on which base 32 and the servo motor are mounted. Linear guide 22 and rack and pinion 25 are positioned by support pillar 24 at a certain height from a surface on which manufacturing machine 100 is installed. Linear guide 22 is provided as a guide mechanism for guiding base member 23 in the direction parallel to the z axis. Rack and pinion 25 converts rotation output of the servo motor into linear motion to move base member 23 in the z-axis direction.

Base 32 is supported by movement mechanism 21. Base 32 has a shape protruding downward from movement mechanism 21 in the vertical direction. Arm 33 is coupled to base 32 in such a manner that allows arm 33 to be pivotable about a pivot axis 211. In FIG. 3, pivot axis 211 extends in the direction parallel to the y axis. Coupling part 36 is disposed at the leading end of arm 33.

Arm 33 is formed to extend in an arm shape from base 32 toward coupling part 36. Arm 33 has one end and the other end provided with base 32 and coupling part 36, respectively. Arm 33 is formed to extend in an arm shape in a plane orthogonal to pivot axis 211. Arm 33 swings on pivot axis 211 as a fulcrum as shown by an arrow 221 in FIG. 3. As arm 33 swings, the position of coupling part 36 is changed in a plane orthogonal to pivot axis 211.

Coupling part 36 is provided as a coupling mechanism to join robot arm 31 with coupling part 54 of workpiece gripper 51 and coupling part 63 of additive manufacturing head 61 mentioned above.

Arm 33 is made up of a first movable unit 33L, a second movable unit 33M, and a third movable unit 33N.

First movable unit 33L is coupled to base 32 so as to be pivotable about pivot axis 211 (first pivot axis). First movable unit 33L is formed to extend from base 32 in an arm shape in the direction orthogonal to pivot axis 211. First movable unit 33L swings on pivot axis 211 as a fulcrum as shown by an arrow 221 in FIG. 3.

Second movable unit 33M is coupled to first movable unit 33L so as to be pivotable about a pivot axis 212 (second pivot axis). Pivot axis 212 extends in the direction parallel to pivot axis 211. Second movable unit 33M is coupled to the end of first movable unit 33L that extends from base 32 in an arm shape. Second movable unit 33M extends from first movable unit 33L in an arm shape in the direction orthogonal to pivot axis 212. Second movable unit 33M swings on pivot axis 212 as a fulcrum as shown by an arrow 222 in FIG. 3.

Third movable unit 33N is coupled to second movable unit 33M so as to be pivotable about a pivot axis 213 (third pivot axis). Pivot axis 213 extends in the direction parallel to pivot axis 211 and pivot axis 212. Third movable unit 33N is coupled to the end of second movable unit 33M that extends from first movable unit 33L in an arm shape. Third movable unit 33N extends from second movable unit 33M in an arm shape in the direction orthogonal to pivot axis 213. Third movable unit 33N swings on pivot axis 213 as a fulcrum as shown by an arrow 223 in FIG. 3.

Base 32 is provided so as to be rotatable about a rotation axis 214 (first rotation axis) as shown by an arrow 224 in FIG. 3. Rotation axis 214 extends in the direction orthogonal to pivot axis 211. Rotation axis 214 extends in the vertical direction.

Second movable unit 33M extends in an arm shape in the axial direction of a rotation axis 215 (second rotation axis). Second movable unit 33M is provided so as to be rotatable about rotation axis 215 as shown by an arrow 225 in FIG. 3. Rotation axis 215 extends in the direction orthogonal to pivot axis 212. Third movable unit 33N extends in an arm shape in the axial direction of rotation axis 216 (third rotation axis). Third movable unit 33N is provided so as to be rotatable about rotation axis 216 as shown by an arrow 226 in FIG. 3. Rotation axis 216 extends in the direction orthogonal to pivot axis 213.

Robot arm 31 is thus configured so that six axes (pivot axes 211 to 213 and rotation axes 214 to 216) are controllable independently of one another.

While robot arm 31 described in connection with the present embodiment is a robot arm whose six axes are controllable, the robot arm may be any robot arm whose multiple axes other than six axes are controllable. Moreover, while robot arm 31 in the present embodiment has a linear motion mechanism (movement mechanism 21), the robot arm may not have such a linear motion mechanism or may be configured to have only linear motion mechanisms for multiple axes (typically three axes).

Referring to FIGS. 1 and 2, in the present embodiment, when a workpiece is transported between machining area 200 and external area 205, workpiece gripper 51 is mounted on robot arm 31. In the following, it is supposed for example that a workpiece 41 stored at stocker 156 is transported from external area 205 into machining area 200 to be mounted on first headstock 111.

First, robot arm 31 is activated to cause workpiece gripper 51 stored at stocker 156 to be mounted on robot arm 31. Robot arm 31 is activated to cause workpiece 41 stored at stocker 156 to be gripped by workpiece gripper 51.

Next, robot arm 31 is moved from external area 205 into machining area 200 to allow workpiece 41 to enter machining area 200. Robot arm 31 is activated to cause gripped workpiece 41 to approach spindle 112 of first headstock 111. After workpiece 41 is positioned at a predetermined location with respect to spindle 112, workpiece 41 is held by chucking on spindle 112. At the timing of chucking of workpiece 41, workpiece 41 is released from workpiece gripper 51. Finally, robot arm 31 is withdrawn from machining area 200 into external area 205.

In the present embodiment, additive manufacturing head 61 is mounted on robot arm 31 when additive manufacturing is performed on a workpiece. In the following, it is supposed for example that additive manufacturing is performed on workpiece 41 mounted on first headstock 111.

Figure 4:
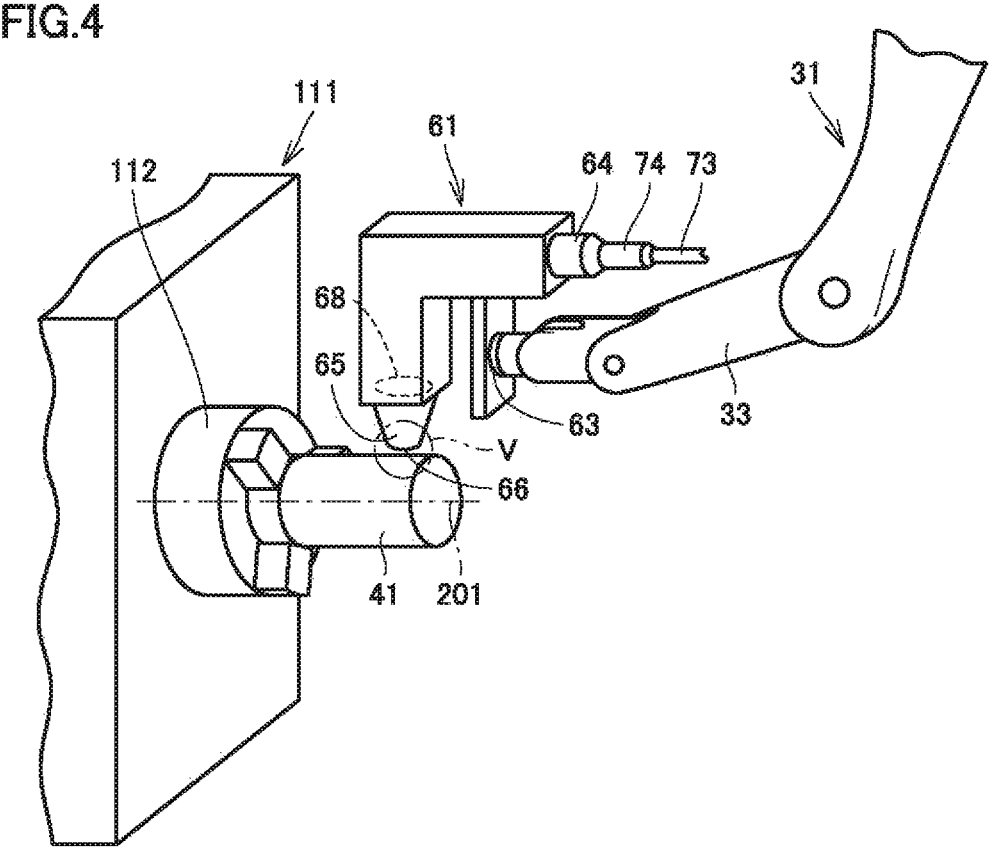
FIG. 4 is a perspective view showing the inside of a machining area during additive manufacturing in the manufacturing machine in FIG. 1.

FIG. 4 is a perspective view showing the inside of the machining area during additive manufacturing in the manufacturing machine in FIG. 1. Referring to FIGS. 1, 2, and 4, robot arm 31 is first activated to cause additive manufacturing head 61 stored at stocker 156 to be mounted on robot arm 31.

Second, robot arm 31 is moved from external area 205 into machining area 200 to allow additive manufacturing head 61 to enter machining area 200. Robot arm 31 is activated to cause additive manufacturing head 61 to approach workpiece 41 mounted on first headstock 111.

Figure 5:
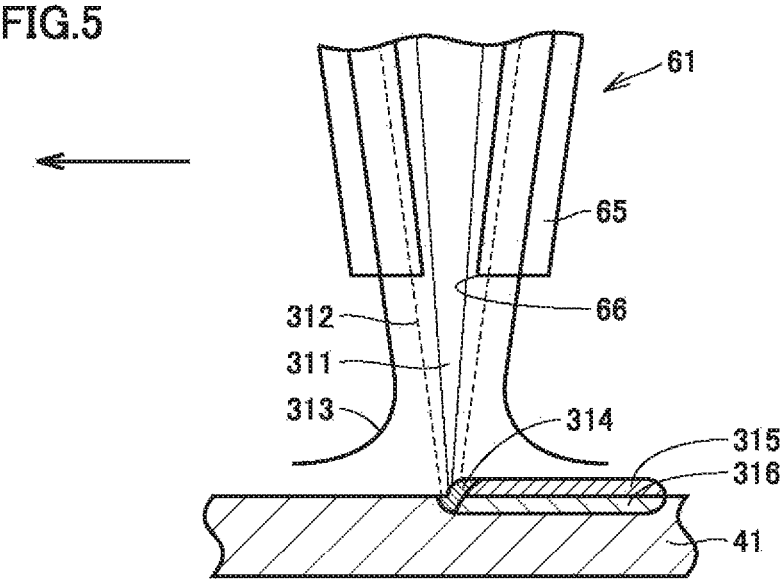
FIG. 5 is an enlarged cross-sectional view of an area enclosed by a two-dot chain line V in FIG. 4.

FIG. 5 is an enlarged cross-sectional view of an area enclosed by a two-dot chain line V in FIG. 4. Referring to FIGS. 4 and 5, operation of robot arm 31 and/or rotation of spindle 112 causes additive manufacturing head 61 to scan across workpiece 41 with opening 66 facing the surface of workpiece 41. At this time, a laser beam 311, material powder 312, and shield-and-carrier gas 313 are discharged from opening 66 of additive manufacturing head 61 toward workpiece 41. Accordingly, a melt spot 314 is formed in the surface of workpiece 41 and consequently material powder 312 is melted and deposited.

Specifically, a cladding layer 316 is formed in the surface of workpiece 41. On cladding layer 316, a cladding material 315 is deposited. Cladding material 315 is cooled into a machinable layer formed on the surface of workpiece 41. Instead of laser beam 311, an electron beam may be used. As the material powder, metal powder of aluminum alloy, magnesium alloy, or the like, or ceramic powder may be used.

After additive manufacturing is completed, robot arm 31 is withdrawn from machining area 200 into external area 205.

While the above description is of the AM/SM hybrid manufacturing machine configured on the basis of a multifunctional manufacturing machine having both a turning function and a milling function, the configuration is not limited to this. Specifically, an AM/SM hybrid manufacturing machine may be configured based on a lathe having a turning function or a machining center having a milling function. When the AM/SM hybrid manufacturing machine is configured based on the machining center, a table is used as a workpiece holder for holding a workpiece within a machining area.

A workpiece processing method in the present embodiment performed using manufacturing machine 100 is described in the following.

Figure 6:
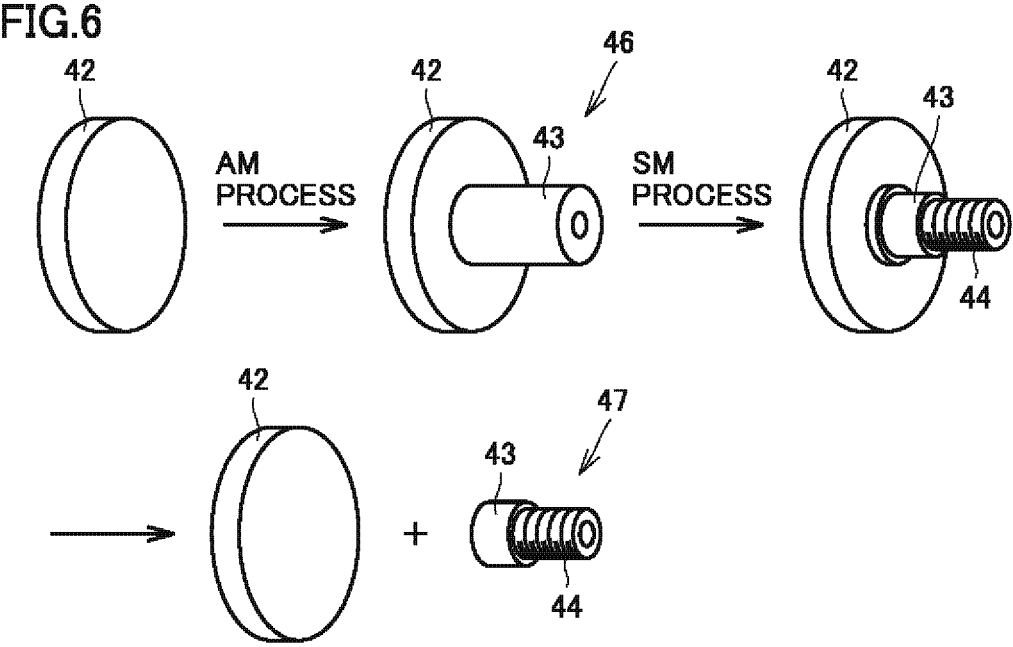
FIG. 6 is a diagram showing a shape of a workpiece changed through additive manufacturing and subtractive manufacturing.

FIG. 6 is a diagram showing a shape of a workpiece changed through additive manufacturing and subtractive manufacturing. Referring to FIG. 6, a base material 42 is prepared first. Base material 42 has a disc shape. Next, additive manufacturing is performed to produce an intermediate product 46 made up of base material 42 and a cladding portion 43 formed on an end face of base material 42. Cladding portion 43 has a cylindrical shape. Next, subtractive manufacturing is performed to form a threaded portion 44 on the outer peripheral surface of cladding portion 43. Finally, base material 42 is separated from cladding portion 43 to produce a final product 47 including threaded portion 44 formed thereon.

FIGS. 7 to 15 are diagrams each schematically showing a step of a workpiece processing method in the first embodiment of the present invention.

Figure 7:
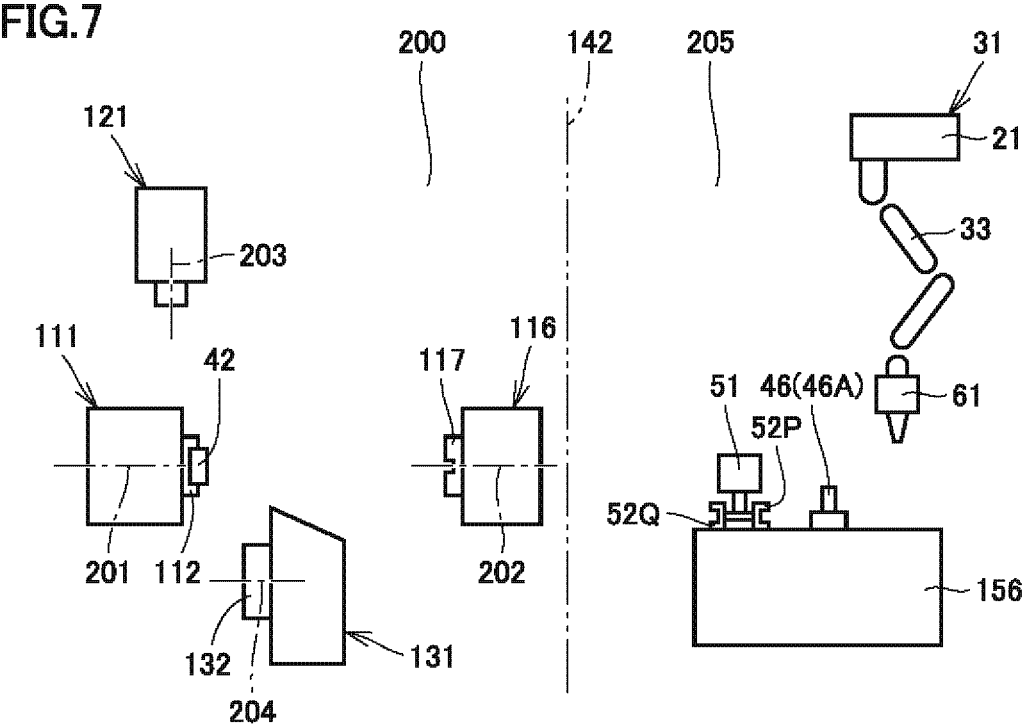
FIG. 7 is a diagram schematically showing a first step of a workpiece processing method in the first embodiment of the present invention.

Referring to FIG. 7, in machining area 200, base material 42 is mounted on first headstock 111. In external area 205, stocker 156 stores an intermediate product 46A prepared in a preceding step, a workpiece gripper 51, and an additive manufacturing head 61. In the present embodiment, workpiece gripper 51 is a double-arm type gripper capable of gripping two workpieces simultaneously, and includes a pair of gripper fingers 52P and a pair of gripper fingers 52Q.

First, robot arm 31 is activated to cause additive manufacturing head 61 stored at stocker 156 to be mounted on robot arm 31.

Figure 8:
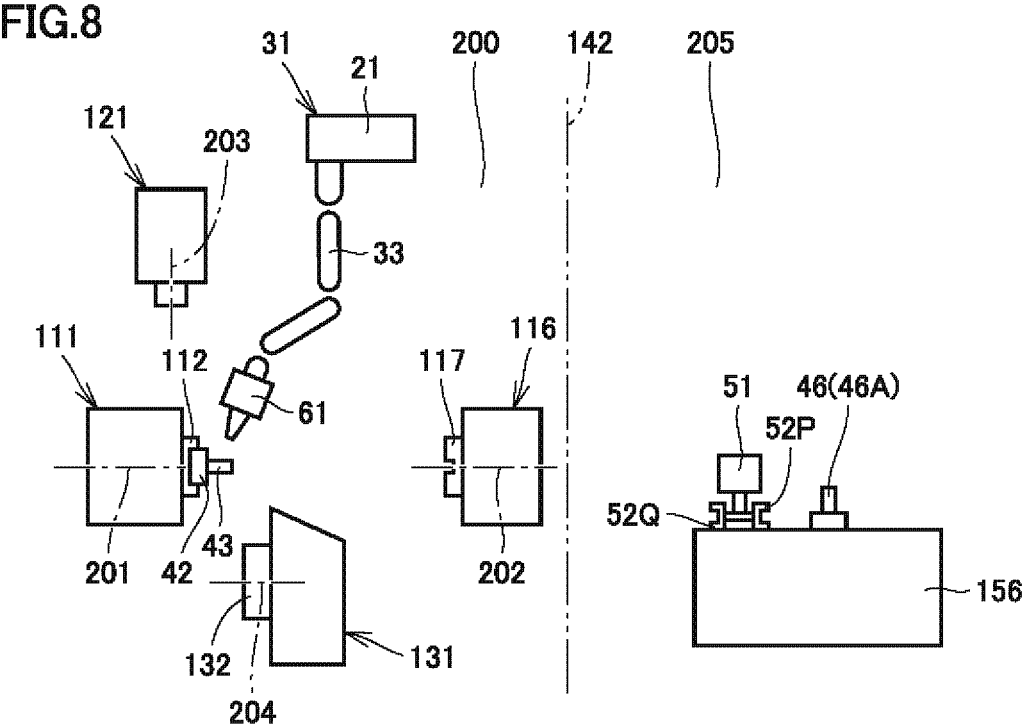
FIG. 8 is a diagram schematically showing a second step of the workpiece processing method in the first embodiment of the present invention.

Referring to FIG. 8, robot arm 31 is then moved from external area 205 into machining area 200. Robot arm 31 is activated to cause additive manufacturing head 61 to approach base material 42 mounted on first headstock 111. By means of additive manufacturing head 61, cladding portion 43 is formed on an end face of base material 42. Accordingly, an intermediate product 46B is produced.

Figure 9:
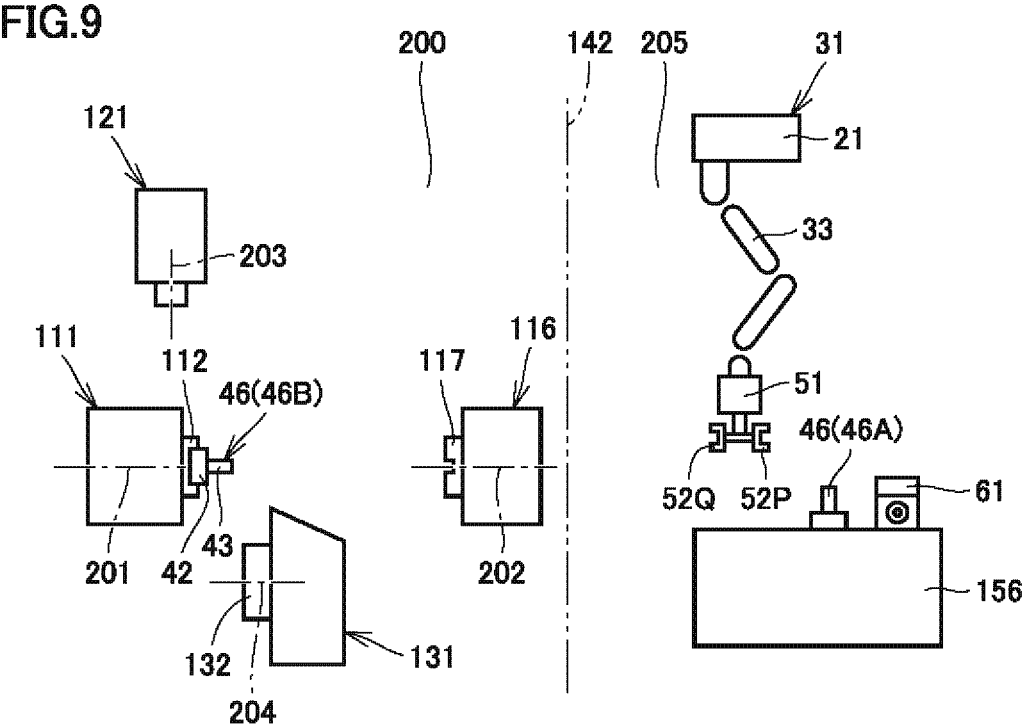
FIG. 9 is a diagram schematically showing a third step of the workpiece processing method in the first embodiment of the present invention.

Referring to FIG. 9, robot arm 31 is then moved from machining area 200 into external area 205. Robot arm 31 is activated to store additive manufacturing head 61 at stocker 156 and cause workpiece gripper 51 stored at stocker 156 to be mounted on robot arm 31, instead of additive manufacturing head 61.

Referring to FIG. 10, robot arm 31 is then activated to cause intermediate product 46A to be gripped by gripper fingers 52P of workpiece gripper 51.

Referring to FIG. 11, robot arm 31 is then moved from external area 205 into machining area 200. Robot arm 31 is activated to cause workpiece gripper 51 to approach intermediate product 46B mounted on first headstock 111 and cause intermediate product 46B to be gripped by gripper fingers 52Q of workpiece gripper 51. Gripper fingers 52P and gripper fingers 52Q are turned to change the workpiece mounted on first headstock 111 from intermediate product 46B to intermediate product 46A.

Figure 12:
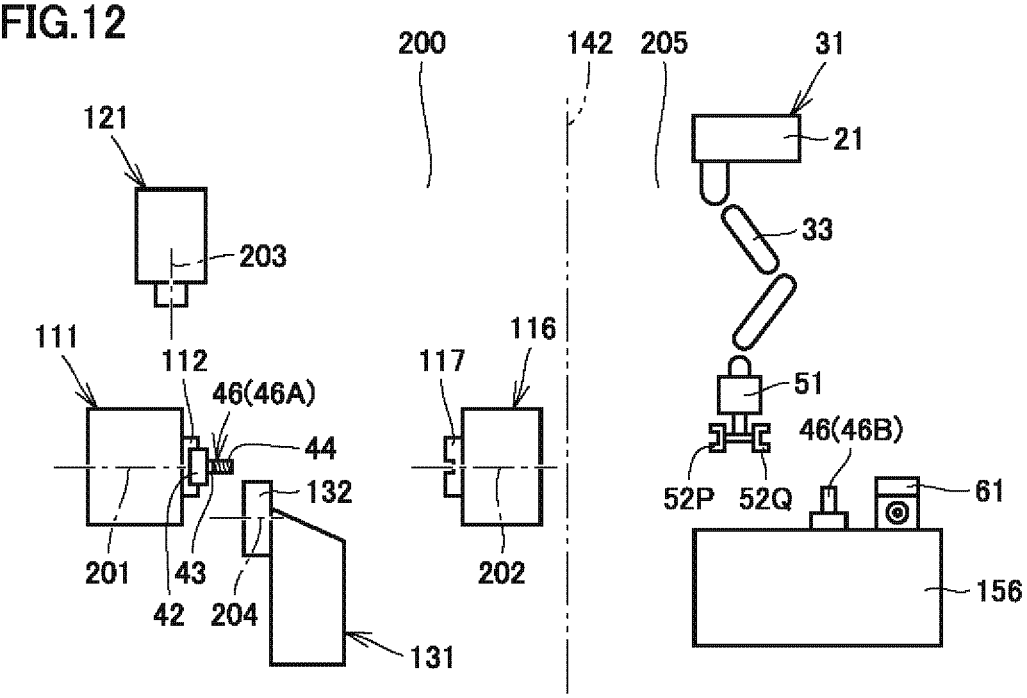
FIG. 12 is a diagram schematically showing a sixth step of the workpiece processing method in the first embodiment of the present invention.

Referring to FIG. 12, robot arm 31 is then moved from machining area 200 into external area 205. Robot arm 31 is activated to cause intermediate product 46B to be stored at stocker 156. Intermediate product 46B increased in temperature by the additive manufacturing described above with reference to FIG. 8 is cooled at stocker 156 until the next step of changing the workpiece as described above with reference to FIG. 11. Robot arm 31 is kept on standby at a position (the position shown in FIG. 13) before shutter 143.

In machining area 200, after robot arm 31 is withdrawn into external area 205 and shutter 143 is closed, subtractive manufacturing for forming threaded portion 44 in cladding portion 43 of intermediate product 46A is started. In the present embodiment, additive manufacturing head 61 is mounted on robot arm 31 to perform additive manufacturing on the workpiece. It is therefore possible to keep lower tool rest 131 or tool spindle 121 on standby with a subtractive manufacturing tool mounted on lower tool rest 131 or tool spindle 121, and thereby shorten the time taken to switch from additive manufacturing to subtractive manufacturing.

Figure 13:
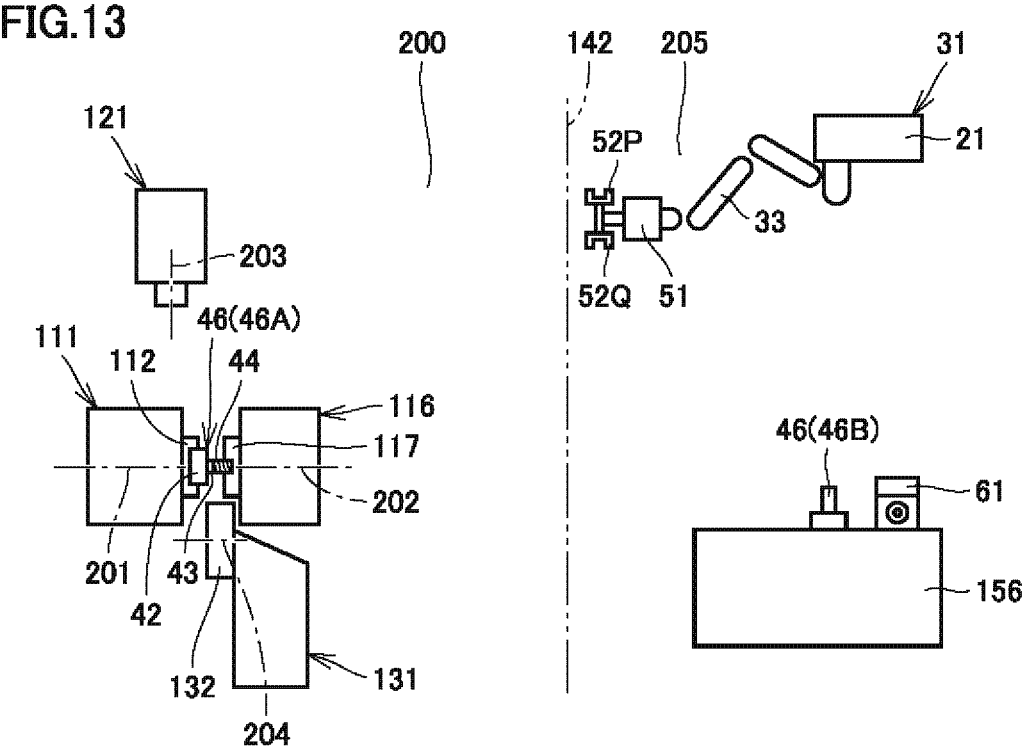
FIG. 13 is a diagram schematically showing a seventh step of the workpiece processing method in the first embodiment of the present invention.

Referring to FIG. 13, first headstock 111 and second headstock 116 are caused to approach each other while respective rotations of spindle 112 and spindle 117 are synchronized with each other. An end of cladding portion 43 of intermediate product 46A is held by chucking on spindle 117. With the opposite ends of intermediate product 46A held by first headstock 111 and second headstock 116, subtractive manufacturing (cut-off machining) is performed for separating base material 42 from cladding portion 43. Accordingly, base material 42 is left on first headstock 111 and a final product 47 is left on second headstock 116.

During subtractive manufacturing, machining area 200 is in an atmosphere of cutting oil. In the present embodiment, additive manufacturing head 61 is placed in external area 205 during subtractive manufacturing, and therefore, additive manufacturing head 61 having optical elements can be prevented from being exposed to the cutting oil. Even if control of robot arm 31 on which additive manufacturing head 61 is mounted malfunctions, the malfunction can be prevented from influencing machining area 200.

Figure 14:
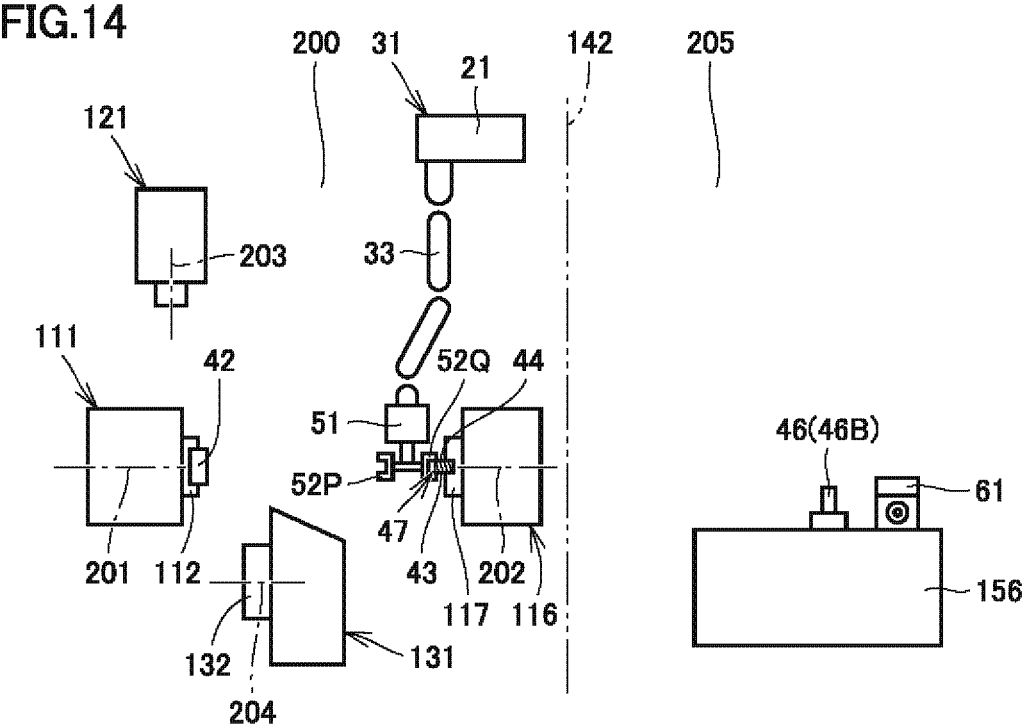
FIG. 14 is a diagram schematically showing an eighth step of the workpiece processing method in the first embodiment of the present invention.

Referring to FIG. 14, robot arm 31 is then moved from external area 205 into machining area 200. Robot arm 31 is activated to cause workpiece gripper 51 to approach final product 47 mounted on second headstock 116 and cause final product 47 to be gripped by workpiece gripper 51.

Figure 15:
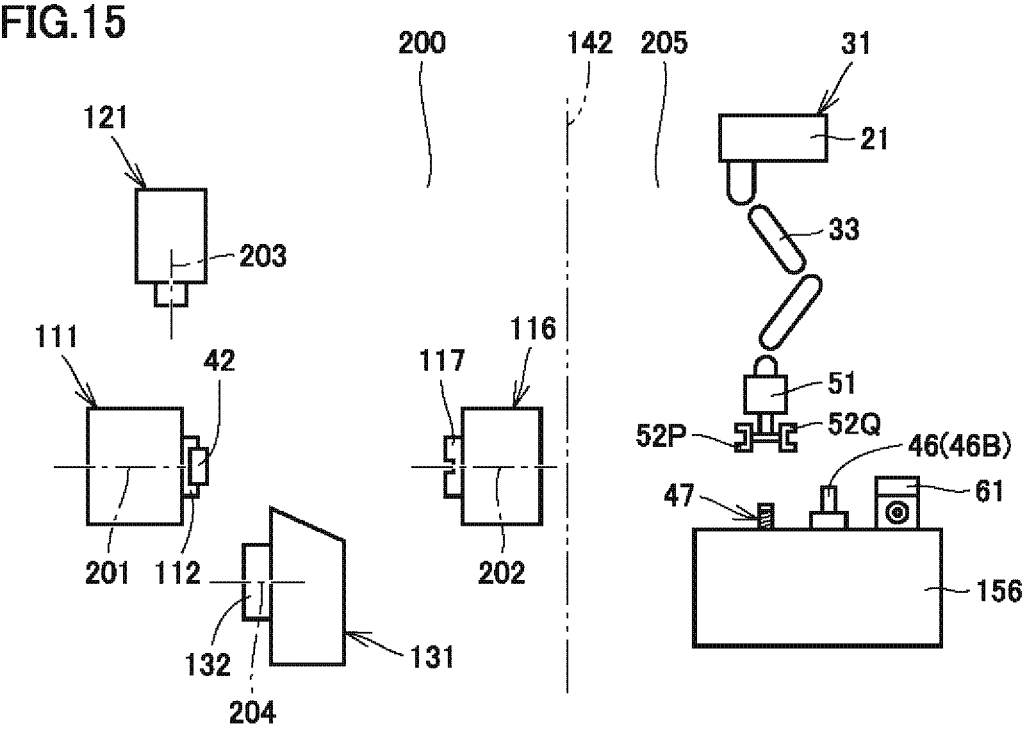
FIG. 15 is a diagram schematically showing a ninth step of the workpiece processing method in the first embodiment of the present invention.

Referring to FIG. 15, robot arm 31 is then moved from machining area 200 into external area 205. Robot arm 31 is activated to store final product 47 at stocker 156. Robot arm 31 is activated to cause workpiece gripper 51 to be stored at stocker 156. Accordingly, the process returns to the step described above with reference to FIG. 7.

FIG. 16 is a diagram showing a flow of steps of a workpiece processing method in the first embodiment of the present invention. Referring to FIG. 16, a description is given of a flow of steps of successively processing a plurality of workpieces (intermediate product 46A, intermediate product 46B, intermediate product 46C, intermediate product 46D . . . ) by additive manufacturing and subtracting manufacturing, in accordance with the above-described workpiece processing method.

First, in Step a, an intermediate product 46A is formed by additive manufacturing in machining area 200.

Next, in Step b, with intermediate product 46A kept on standby in external area 205, an intermediate product 46B is formed by additive manufacturing in machining area 200 (the step in FIG. 8). Intermediate product 46A having its temperature increased through the additive manufacturing is cooled in external area 205.

Next, in Step c, with intermediate product 46B kept on standby in external area 205, intermediate product 46A is subjected to subtractive manufacturing in machining area 200 (the steps in FIGS. 12 and 13). Next, in Step d, with intermediate product 46B kept on standby in external area 205, an intermediate product 46C is formed by additive manufacturing in machining area 200. Intermediate product 46B having its temperature increased through the additive manufacturing is cooled in external area 205.

Next, in Step e, with intermediate product 46C kept on standby in external area 205, intermediate product 46B is subjected to subtractive manufacturing in machining area 200. Next, returning to a step corresponding to Step b, with intermediate product 46C kept on standby in external area 205, an intermediate product 46D is subjected to subtractive manufacturing in machining area 200. After this, Step c, Step d, Step e, and Step b are repeated to successively process workpieces by additive manufacturing and subtractive manufacturing.

In accordance with the workpiece processing method in the first embodiment of the present invention configured in this manner, the step of cooling a standby workpiece with its temperature increased by additive manufacturing and the step of performing subtractive manufacturing on a workpiece or additive manufacturing on a workpiece are carried out in parallel. Accordingly, the productivity of the process of successively processing a plurality of workpieces by means of additive manufacturing and subtractive manufacturing can be improved.

Particularly in the present embodiment, additive manufacturing is performed in which material powder is discharged and simultaneously energy is applied to the discharged material powder to melt the material powder and form the workpiece (directed energy deposition method). As compared with the powder bed fusion method in which the step of forming a thin material powder layer and the step of melting a selected region of the material powder layer by applying energy thereto are repeated in this order, the directed energy deposition method tends to take a long time for removing heat from the workpiece having been subjected to additive manufacturing. In view of this, the workpiece processing method in the present embodiment is more suitably applied in which the step of cooling a standby workpiece having been subjected to additive manufacturing, and the step of performing subtractive manufacturing on a workpiece/the step of performing additive manufacturing on a workpiece is performed in parallel to thereby improve the productivity of workpiece processing.

Second Embodiment

FIGS. 17 to 24 are each a diagram schematically showing a step in a workpiece processing method in a second embodiment of the present invention.

Referring to FIGS. 17 to 24, a manufacturing machine used for the workpiece processing method in the present embodiment includes a first headstock (headstock) 111, a lower tool rest 131, a tool spindle 121, a robot arm 31, and an additive manufacturing head 61. In the present embodiment, additive manufacturing head 61 used for additive manufacturing and a tool 91 used for subtractive manufacturing are selectively attached to tool spindle 121. To lower tool rest 131, a workpiece holder 92 capable of holding a workpiece is attached.

Referring to FIG. 17, in a machining area 200, a base material 42A is mounted on first headstock 111. On workpiece holder 92 of lower tool rest 131, a base material 42B is mounted. First, additive manufacturing head 61 is attached to tool spindle 121.

Figure 18:
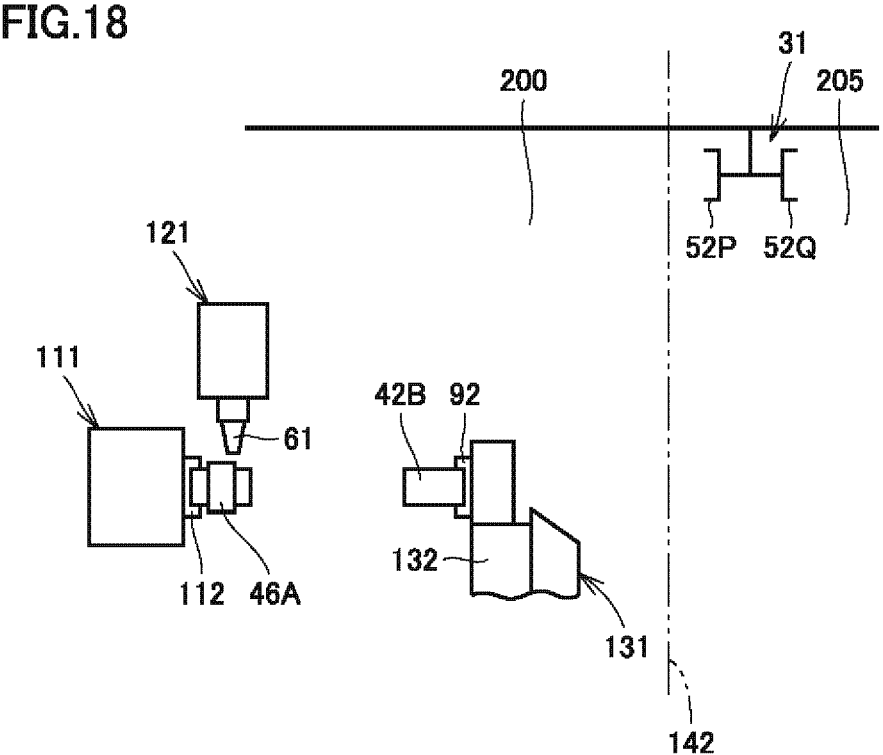
FIG. 18 is a diagram schematically showing a second step of the workpiece processing method in the second embodiment of the present invention.

Referring to FIG. 18, tool spindle 121 is then caused to approach base material 42A mounted on first headstock 111. Additive manufacturing is performed with additive manufacturing head 61 to produce an intermediate product 46A.

Figure 19:
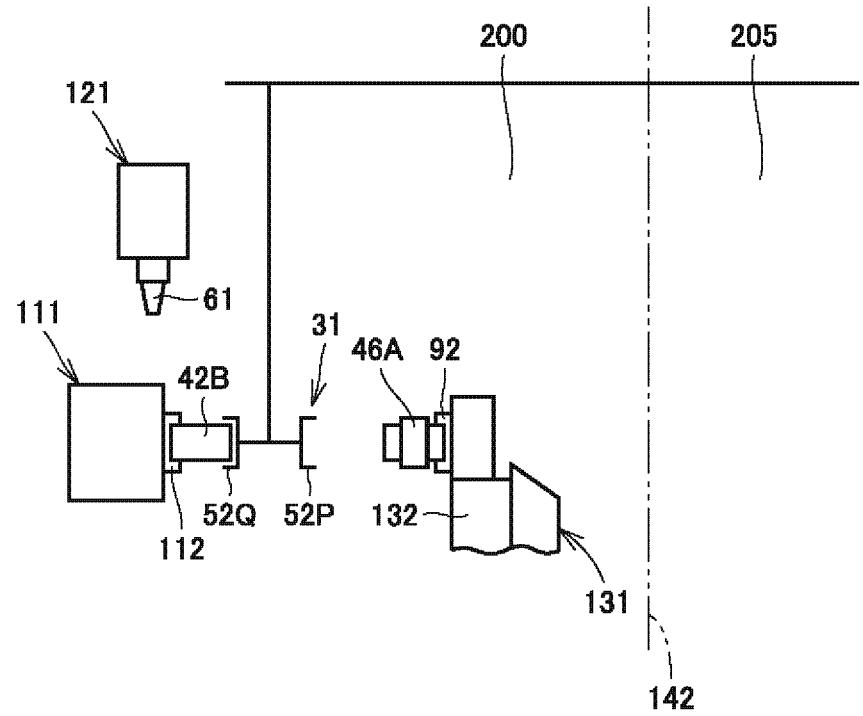
FIG. 19 is a diagram schematically showing a third step of the workpiece processing method in the second embodiment of the present invention.

Referring to FIG. 19, robot arm 31 is then activated to cause gripper fingers 52P to grip intermediate product 46A and cause gripper fingers 52Q to grip base material 42B. Gripper fingers 52P and gripper fingers 52Q are turned to mount base material 42B on first headstock 111 and mount intermediate product 46A on workpiece holder 92 of lower tool rest 131.

Figure 20:
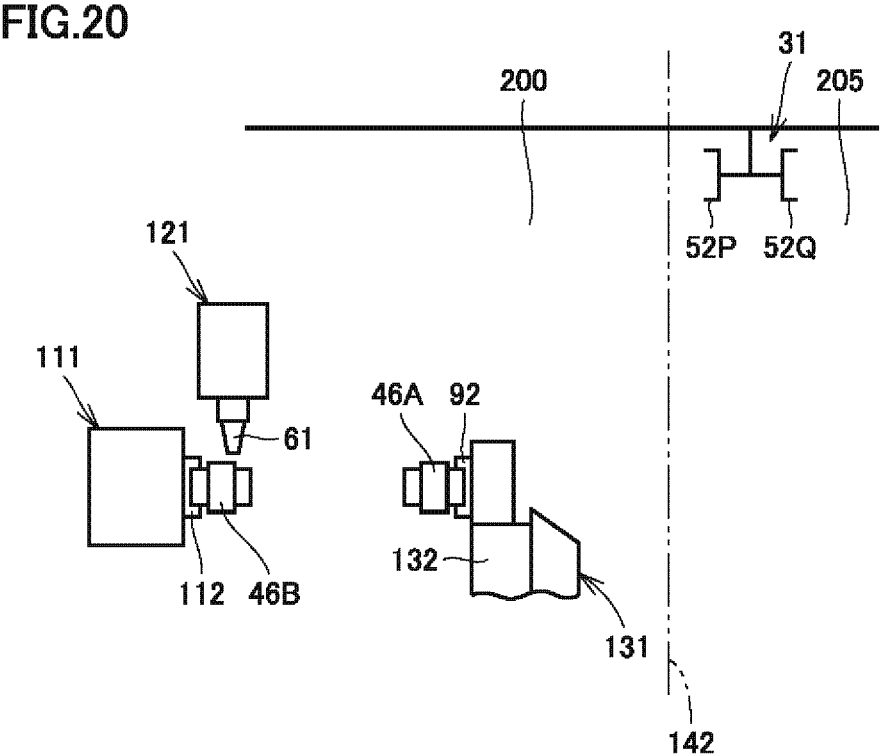
FIG. 20 is a diagram schematically showing a fourth step of the workpiece processing method in the second embodiment of the present invention.

Referring to FIG. 20, tool spindle 121 is then caused to approach base material 42B mounted on first headstock 111. Additive manufacturing is performed with additive manufacturing head 61 to produce an intermediate product 46B. During this additive manufacturing, intermediate product 46A mounted on workpiece holder 92 of lower tool rest 131 is cooled. Respective shapes of intermediate product 46A and intermediate product 46B obtained through additive manufacturing may be identical to or different from each other.

Figure 21:
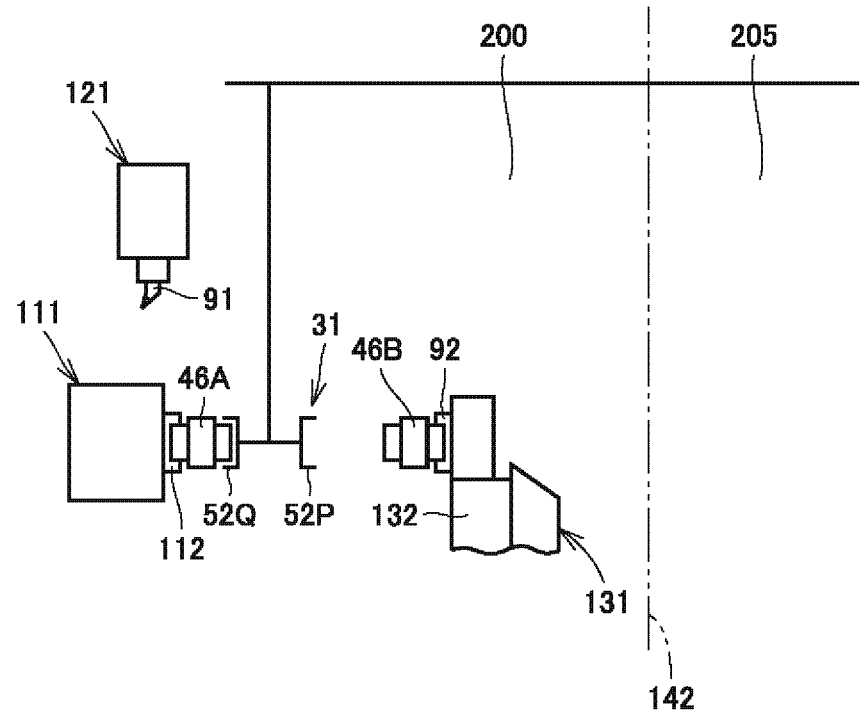
FIG. 21 is a diagram schematically showing a fifth step of the workpiece processing method in the second embodiment of the present invention.

Referring to FIG. 21, robot arm 31 is then activated to cause gripper fingers 52P to grip intermediate product 46B and cause gripper fingers 52Q to grip intermediate product 46A. Gripper fingers 52P and gripper fingers 52Q are turned to mount intermediate product 46A on first headstock 111 and mount intermediate product 46B on workpiece holder 92 of lower tool rest 131. Instead of additive manufacturing head 61, tool 91 is attached to tool spindle 121.

Figure 22:
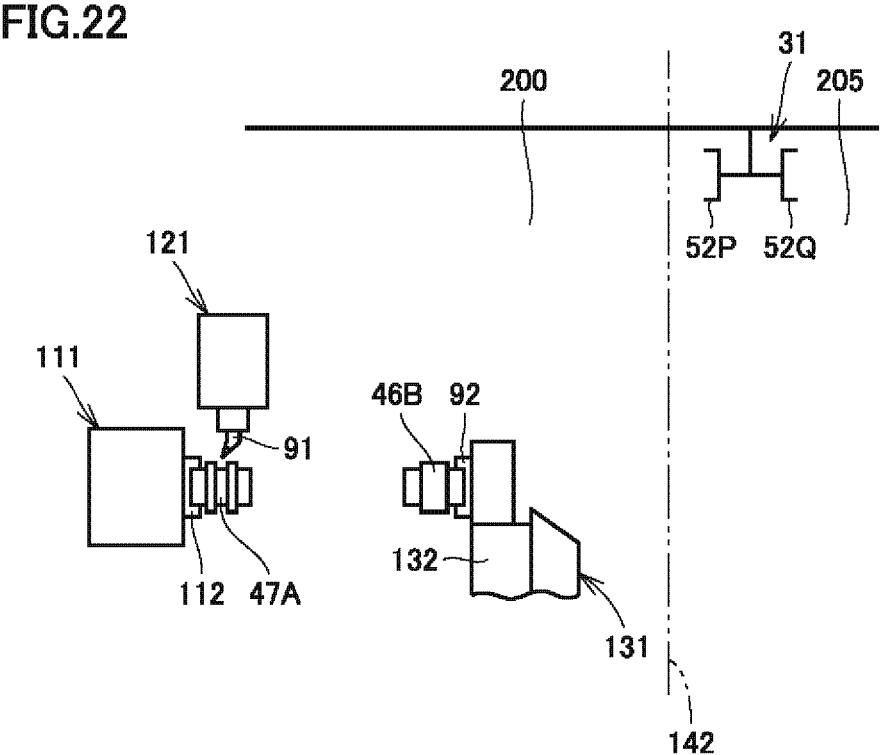
FIG. 22 is a diagram schematically showing a sixth step of the workpiece processing method in the second embodiment of the present invention.

Referring to FIG. 22, tool spindle 121 is then caused to approach intermediate product 46A mounted on first headstock 111. Subtractive manufacturing is performed with tool 91 to produce a final product 47A. During this subtractive manufacturing, intermediate product 46B mounted on workpiece holder 92 of lower tool rest 131 is cooled.

Figure 23:
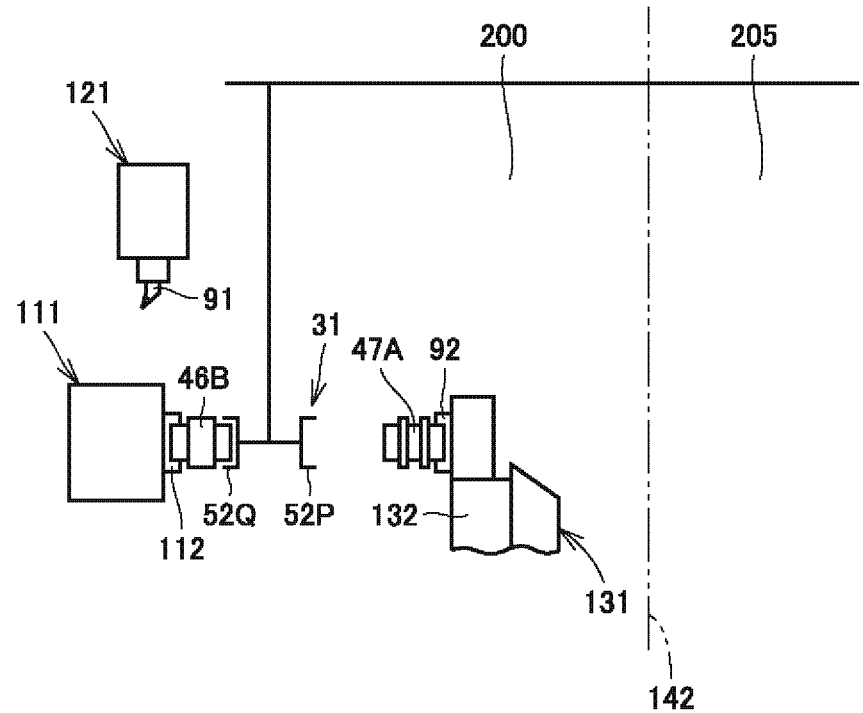
FIG. 23 is a diagram schematically showing a seventh step of the workpiece processing method in the second embodiment of the present invention.

Referring to FIG. 23, robot arm 31 is then activated to cause gripper fingers 52P to grip final product 47A and cause gripper fingers 52Q to grip intermediate product 46B. Gripper fingers 52P and gripper fingers 52Q are turned to mount intermediate product 46B on first headstock 111 and mount final product 47A on workpiece holder 92 of lower tool rest 131.

Figure 24:
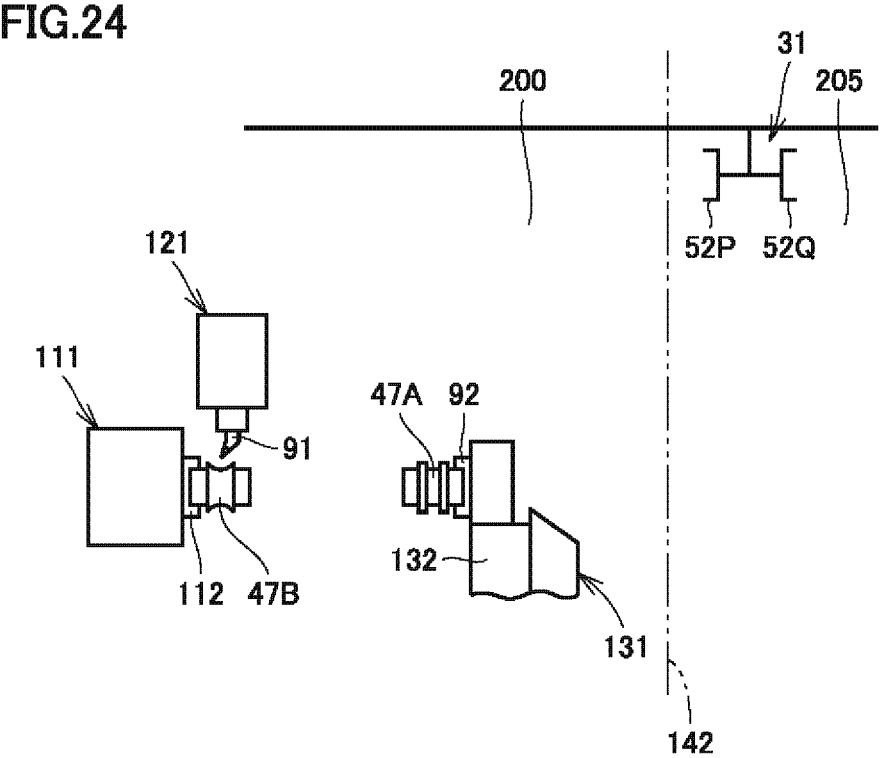
FIG. 24 is a diagram schematically showing an eighth step of the workpiece processing method in the second embodiment of the present invention.

Referring to FIG. 24, tool spindle 121 is then caused to approach intermediate product 46B mounted on first headstock 111. Subtractive manufacturing is performed with tool 91 to produce a final product 47B. From lower tool rest 131 and tool spindle 121, final product 47A and final product 47B are removed, respectively. Respective shapes of final product 47A and final product 47B obtained through additive manufacturing may be identical to or different from each other.

The workpiece processing method in the present embodiment causes one set of two workpieces to be subjected to additive manufacturing and subtractive manufacturing to produce the shape of final products 47 from base materials 42. In this process, an intermediate product 46 is mounted on workpiece holder 92 of lower tool rest 131 and the step of cooling this intermediate product 46 is performed.

The workpiece processing method in the second embodiment of the present invention configured in this manner can produce the effects described above in connection with the first embodiment as well.

Third Embodiment

FIGS. 25 to 34 are each a diagram schematically showing a step in a workpiece processing method in a third embodiment of the present invention.

Referring to FIGS. 25 to 34, a manufacturing machine used for the workpiece processing method in the present embodiment includes a first headstock (headstock) 111, a lower tool rest 131, a tool spindle 121, a robot arm 31, and an additive manufacturing head 61. In the present embodiment, additive manufacturing head 61 used for additive manufacturing and a tool 91 used for subtractive manufacturing are selectively attached to tool spindle 121. At respective different indexing positions of lower tool rest 131, a workpiece holder 92R and a workpiece holder 92S capable of holding a workpiece are attached.

Figure 25:
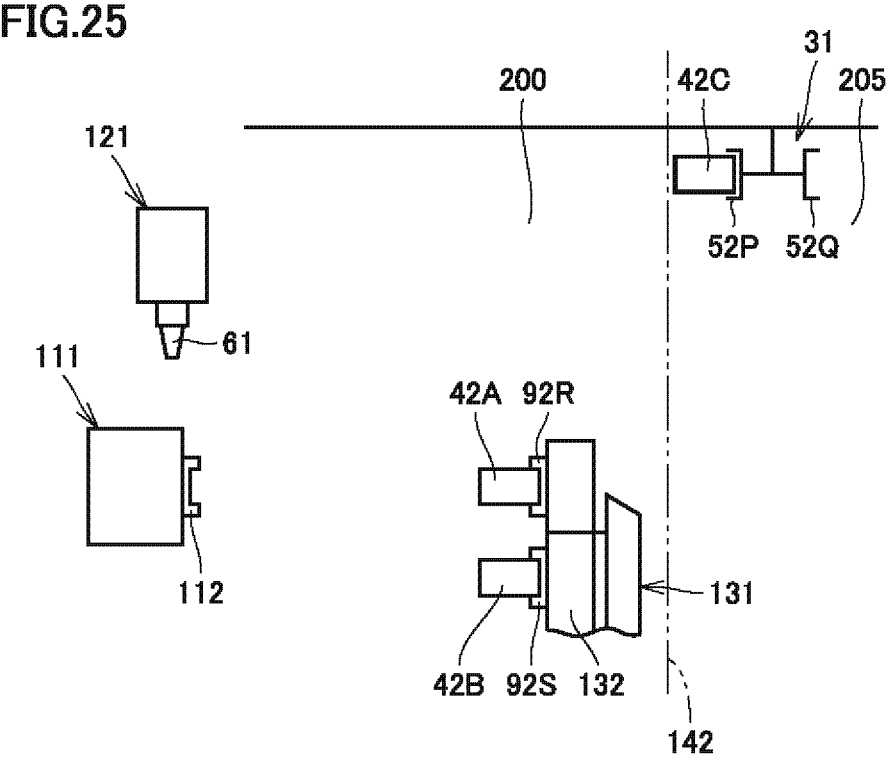
FIG. 25 is a diagram schematically showing a first step of a workpiece processing method in a third embodiment of the present invention.

Referring to FIG. 25, in a machining area 200, a base material 42A is mounted on workpiece holder 92R of lower tool rest 131. A base material 42B is mounted on workpiece holder 92S of lower tool rest 131. In an external area 205, a base material 42C is gripped by gripper fingers 52P of robot arm 31. Additive manufacturing head 61 is first attached to tool spindle 121.

Figure 26:
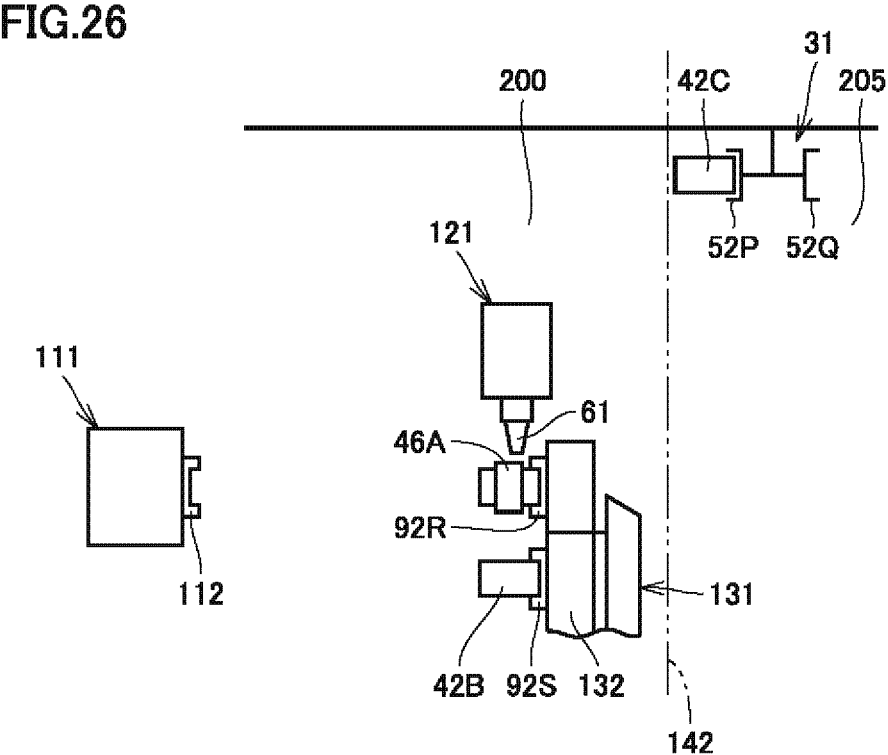
FIG. 26 is a diagram schematically showing a second step of the workpiece processing method in the third embodiment of the present invention.

Referring to FIG. 26, tool spindle 121 is then caused to approach base material 42A mounted on workpiece holder 92R of lower tool rest 131. Additive manufacturing is performed with additive manufacturing head 61 to produce an intermediate product 46A.

Figure 27:
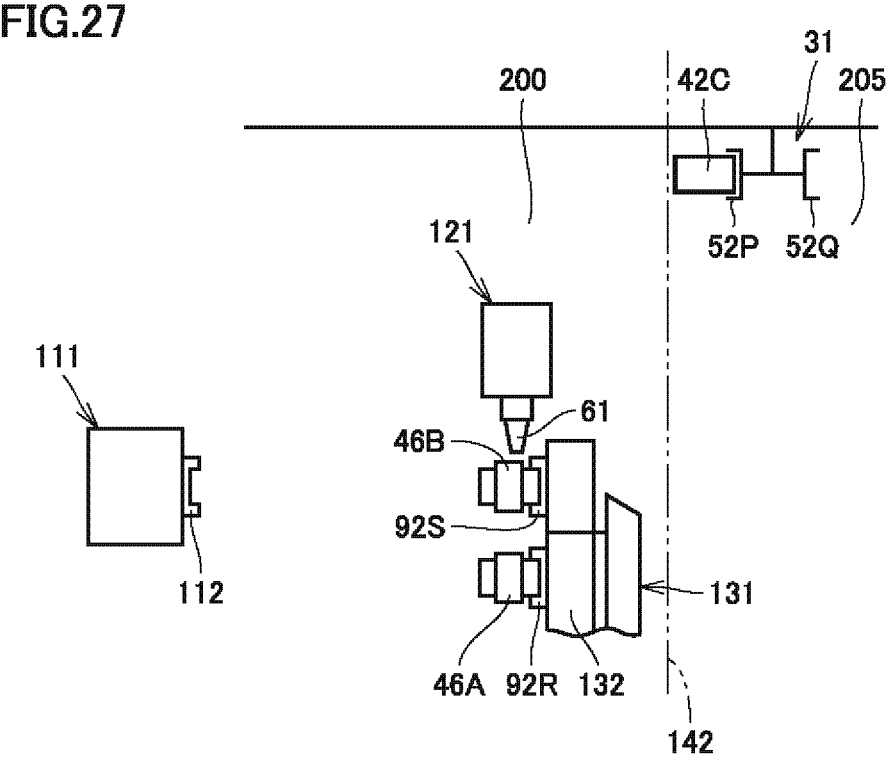
FIG. 27 is a diagram schematically showing a third step of the workpiece processing method in the third embodiment of the present invention.

Referring to FIG. 27, a swivel unit 132 is then caused to swivel to set workpiece holder 92S at a position for machining, instead of workpiece holder 92R. Tool spindle 121 is caused to approach base material 42B mounted on workpiece holder 92S of lower tool rest 131. Additive manufacturing is performed with additive manufacturing head 61 to produce an intermediate product 46B. During this additive manufacturing, intermediate product 46A mounted on workpiece holder 92R of lower tool rest 131 is cooled.

Figure 28:
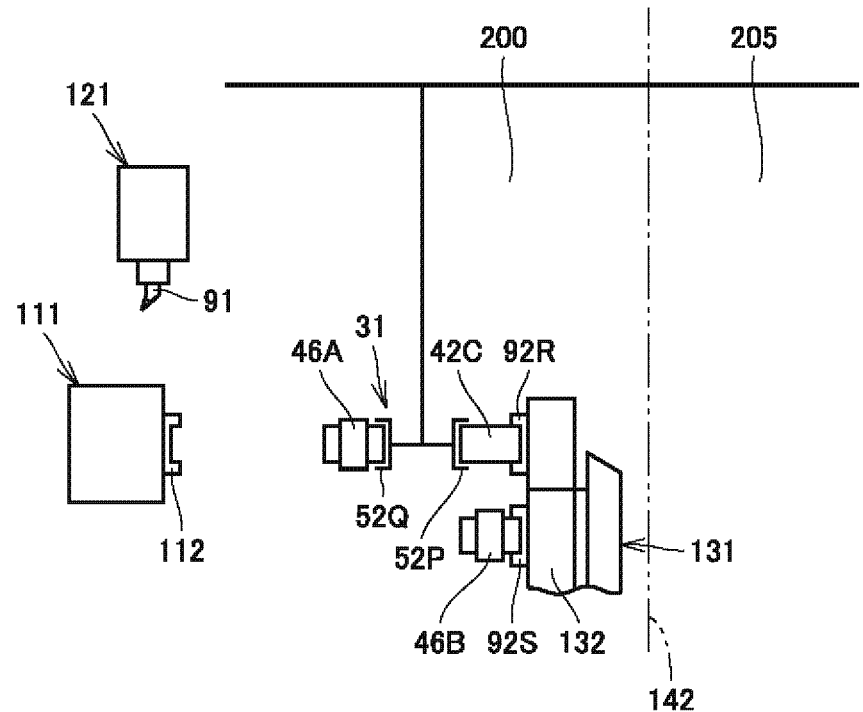
FIG. 28 is a diagram schematically showing a fourth step of the workpiece processing method in the third embodiment of the present invention.
Figure 29:
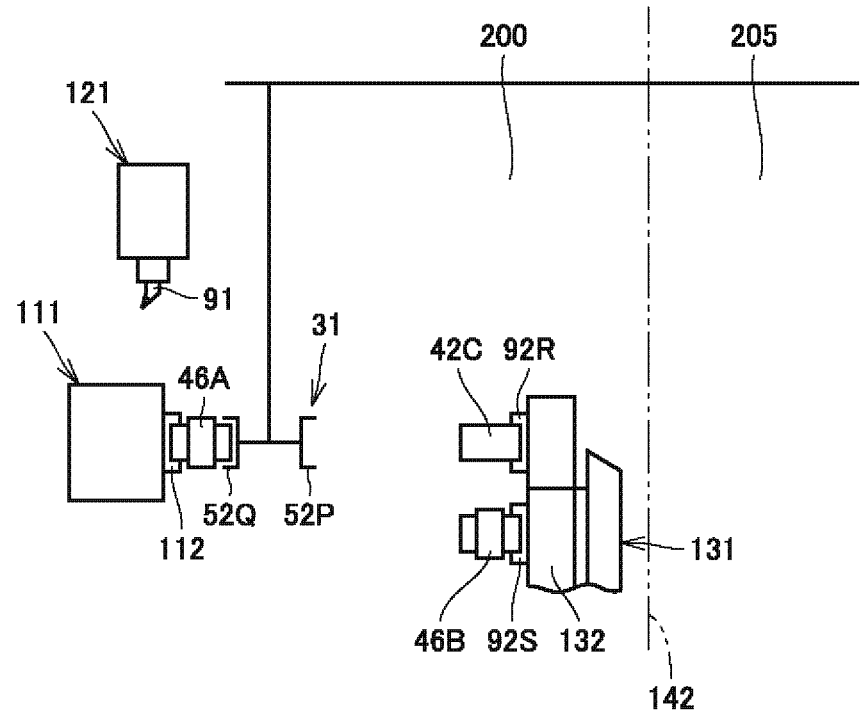
FIG. 29 is a diagram schematically showing a fifth step of the workpiece processing method in the third embodiment of the present invention.

Referring to FIG. 28, robot arm 31 is then activated to cause gripper fingers 52Q to grip intermediate product 46A. Gripper fingers 52P and gripper fingers 52Q are turned to mount base material 42C on workpiece holder 92R of lower tool rest 131. Referring to FIG. 29, robot arm 31 is then activated to cause intermediate product 46A to be mounted on first headstock 111. Instead of additive manufacturing head 61, tool 91 is attached to tool spindle 121.

Figure 30:
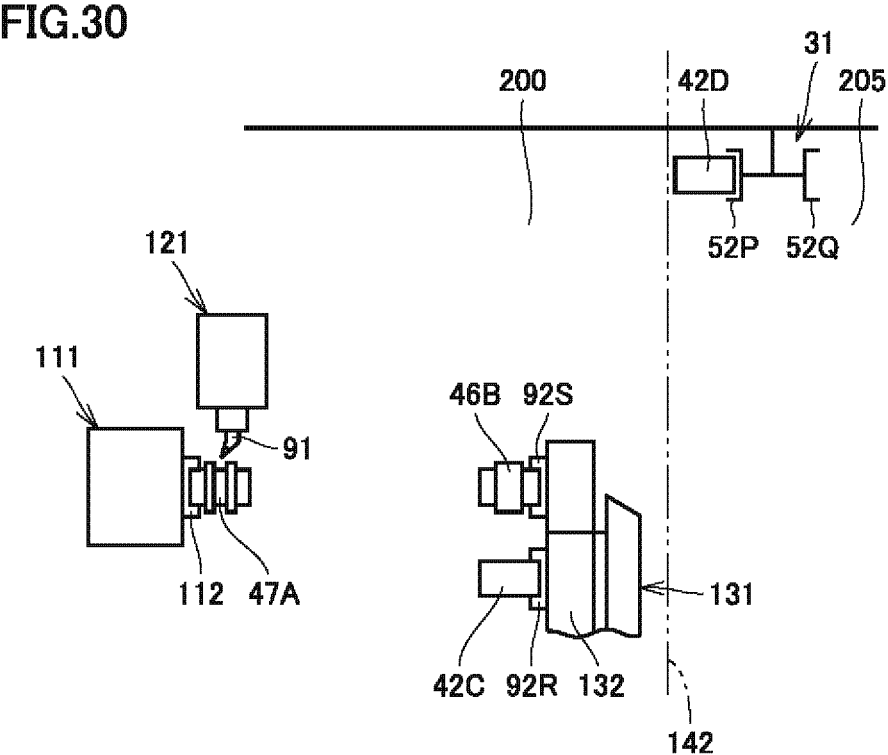
FIG. 30 is a diagram schematically showing a sixth step of the workpiece processing method in the third embodiment of the present invention.

Referring to FIG. 30, tool spindle 121 is then caused to approach intermediate product 46A mounted on first headstock 111. Subtractive manufacturing is performed with tool 91 to produce a final product 47A. During this subtractive manufacturing, intermediate product 46B mounted on workpiece holder 92S of lower tool rest 131 is cooled. In external area 205, gripper fingers 52P of robot arm 31 are caused to grip a base material 42D.

Figure 31:
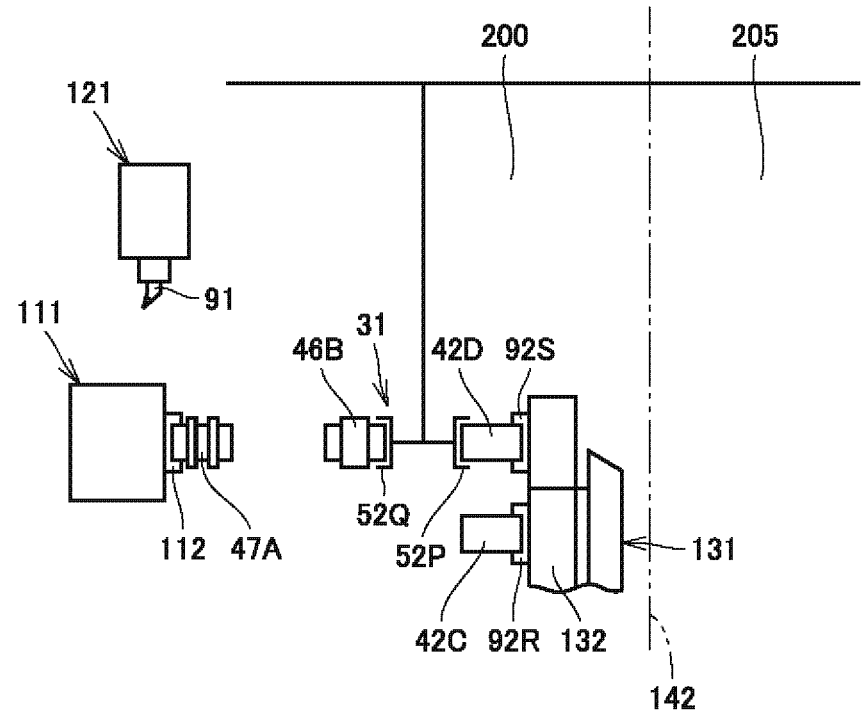
FIG. 31 is a diagram schematically showing a seventh step of the workpiece processing method in the third embodiment of the present invention.
Figure 32:
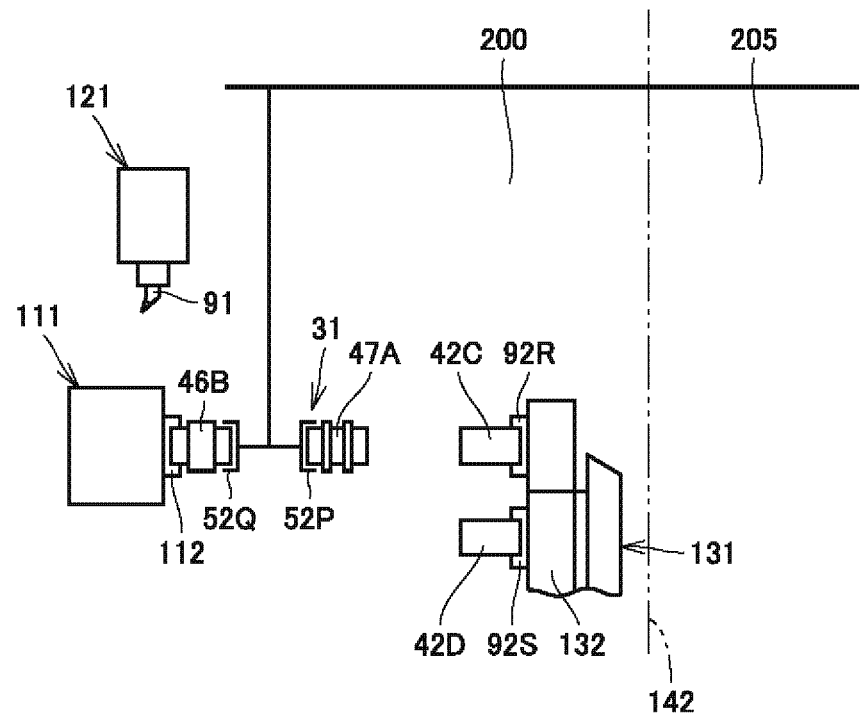
FIG. 32 is a diagram schematically showing an eighth step of the workpiece processing method in the third embodiment of the present invention.

Referring to FIG. 31, robot arm 31 is then activated to cause gripper fingers 52Q to grip intermediate product 46B. Gripper fingers 52P and gripper fingers 52Q are turned to mount base material 42D on workpiece holder 92S of lower tool rest 131. Referring to FIG. 32, robot arm 31 is then activated to cause gripper fingers 52P to grip final product 47A. Gripper fingers 52P and gripper fingers 52Q are turned to mount intermediate product 46B on first headstock 111. Final product 47A gripped by gripper fingers 52P is withdrawn into external area 205.

Figure 33:
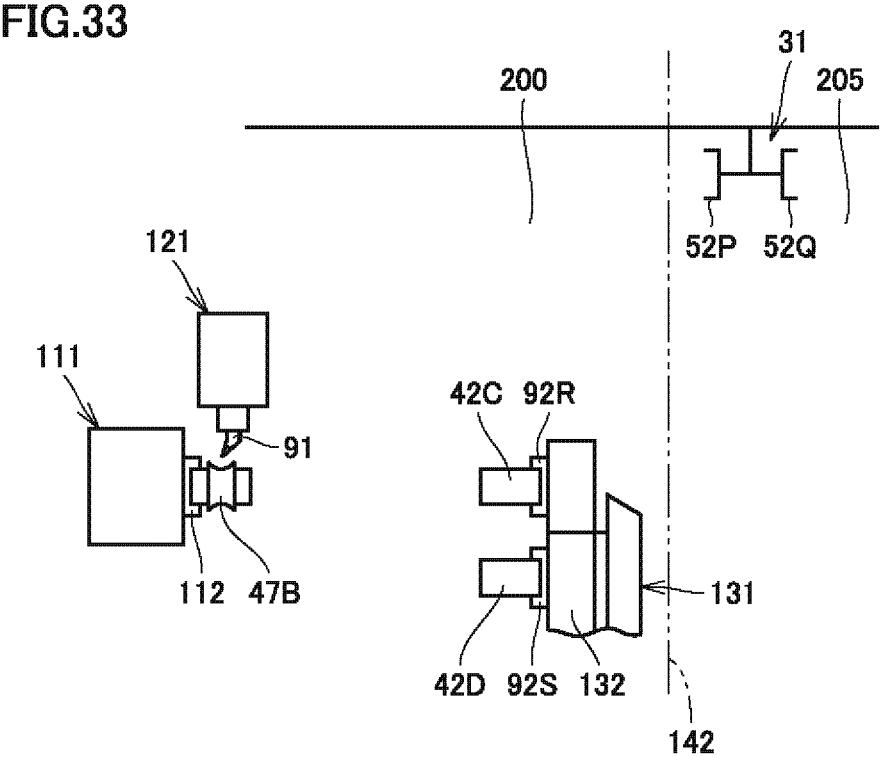
FIG. 33 is a diagram schematically showing a ninth step of the workpiece processing method in the third embodiment of the present invention.
Figure 34:
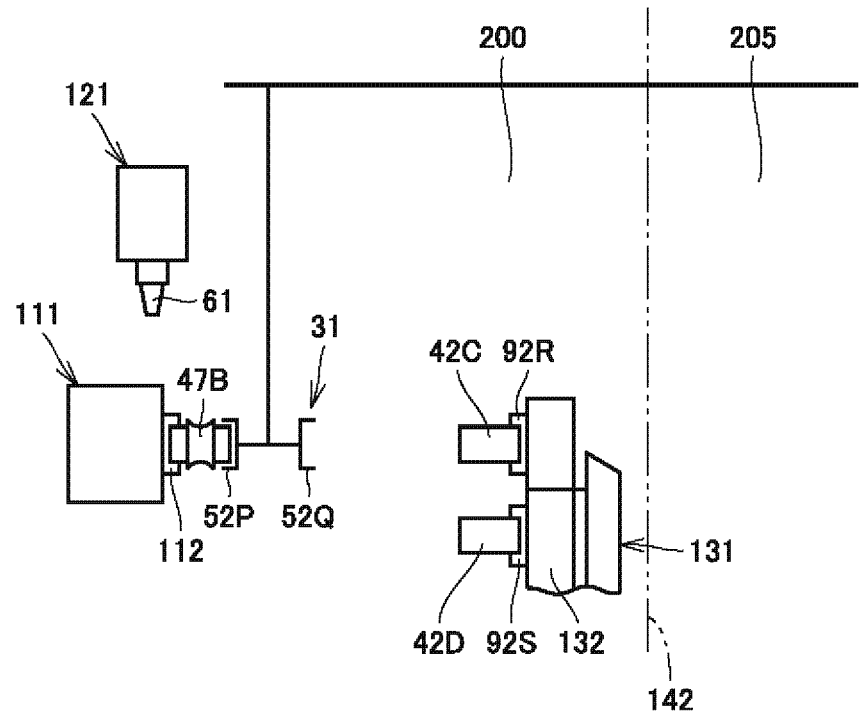
FIG. 34 is a diagram schematically showing a tenth step of the workpiece processing method in the third embodiment of the present invention.

Referring to FIG. 33, tool spindle 121 is then caused to approach intermediate product 46B mounted on first headstock 111. Subtractive manufacturing is performed with tool 91 to produce a final product 47B. Referring to FIG. 34, robot arm 31 is activated to take final product 47B by gripper fingers 52P. Final product 47B gripped by gripper fingers 52P is withdrawn into external area 205.

In accordance with the workpiece processing method in the present embodiment, workpiece's additive manufacturing is performed on a base material 42 mounted on workpiece holder 92 of lower tool rest 131. Until subtractive manufacturing for producing final product 47B is completed, a base material 42 to be processed next is mounted on workpiece holder 92 of lower tool rest 131. A plurality of workpieces can thus be processed successively, which enables improvement of the productivity.

The workpiece processing method in the third embodiment of the present invention configured in this manner can produce the effects described above in connection with the first embodiment as well.

Fourth Embodiment

FIGS. 35 to 43 are each a diagram schematically showing a step in a workpiece processing method in a fourth embodiment of the present invention.

Referring to FIGS. 35 to 43, a manufacturing machine used for the workpiece processing method in the present embodiment includes a first headstock (headstock) 111, a tool spindle 121, a robot arm 31, and an additive manufacturing head 61. In the present embodiment, additive manufacturing head 61 used for additive manufacturing and a tool 91 used for subtractive manufacturing are selectively attached to tool spindle 121.

Figure 35:
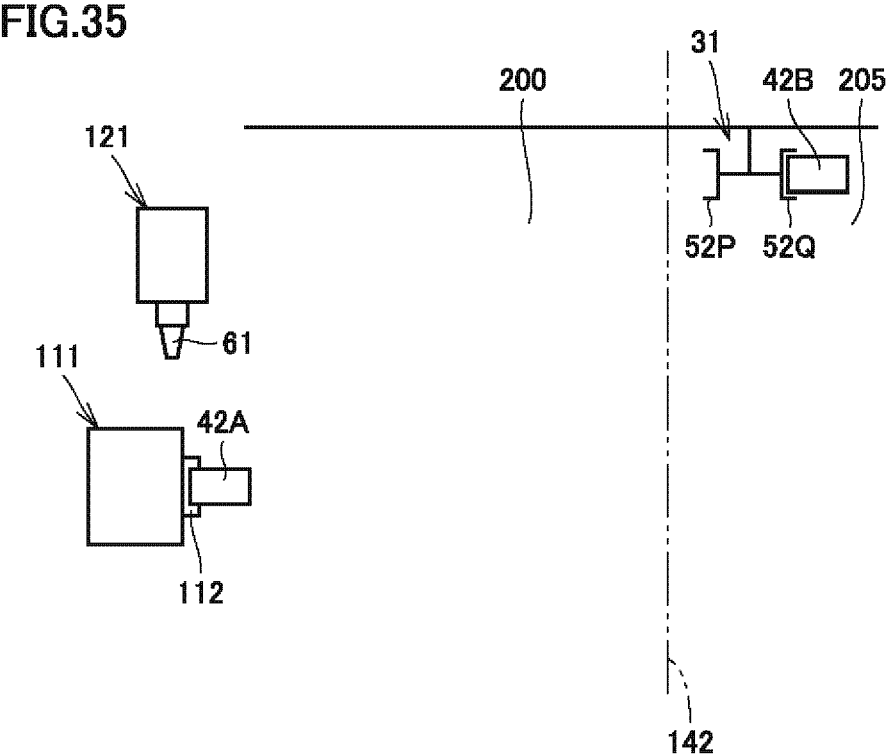
FIG. 35 is a diagram schematically showing a first step of a workpiece processing method in a fourth embodiment of the present invention.

Referring to FIG. 35, in a machining area 200, a base material 42A is mounted on first headstock 111. In an external area 205, gripper fingers 52Q of robot arm 31 grip a base material 42B. Additive manufacturing head 61 is first attached to tool spindle 121.

Figure 36:
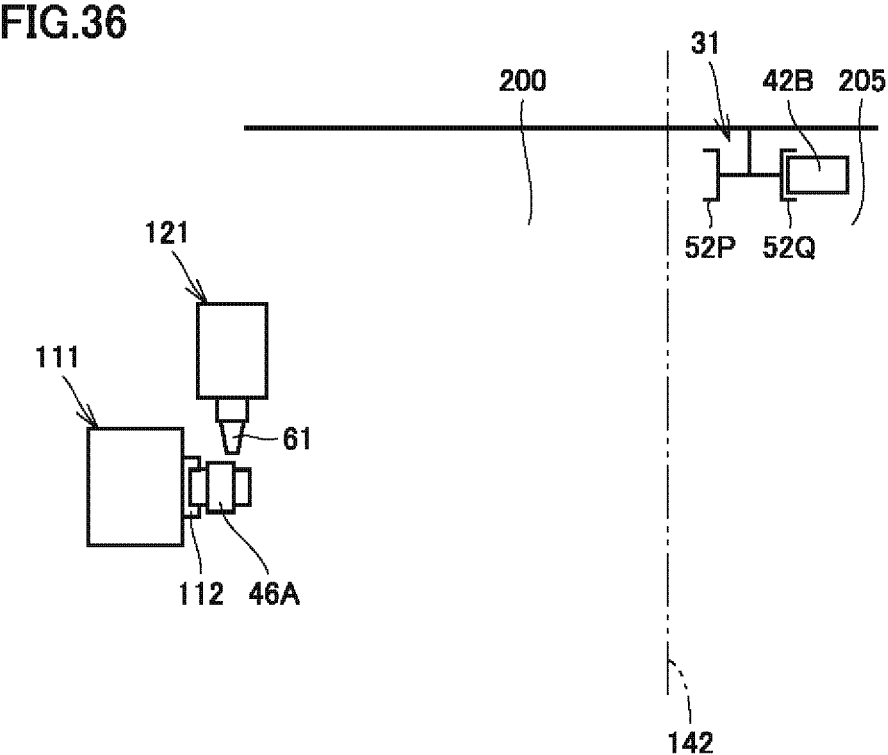
FIG. 36 is a diagram schematically showing a second step of the workpiece processing method in the fourth embodiment of the present invention.

Referring to FIG. 36, tool spindle 121 is caused to approach base material 42A mounted on first headstock 111. Additive manufacturing is performed with additive manufacturing head 61 to produce an intermediate product 46A.

Figure 37:
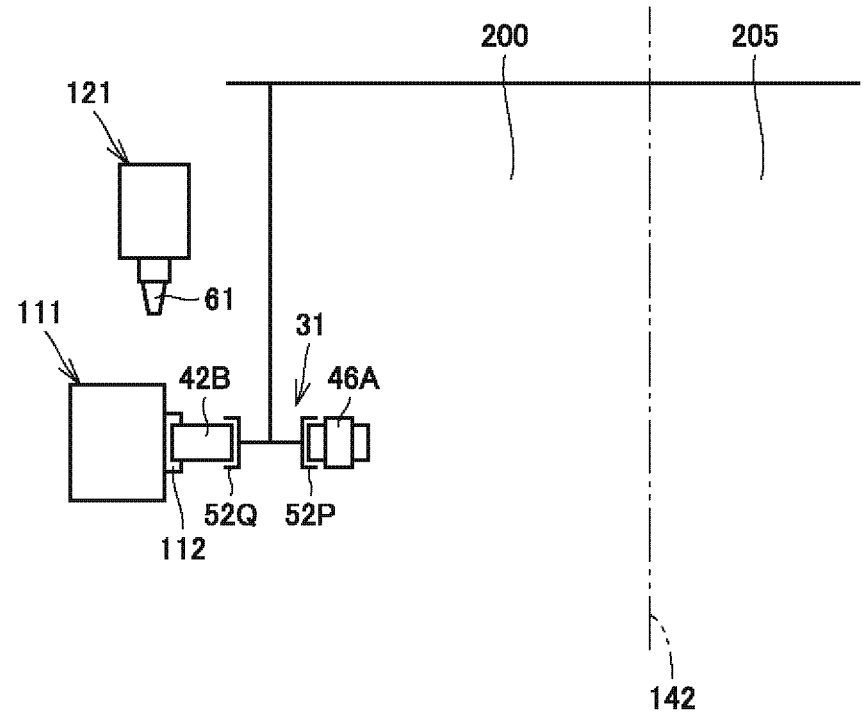
FIG. 37 is a diagram schematically showing a third step of the workpiece processing method in the fourth embodiment of the present invention.

Referring to FIG. 37, robot arm 31 is then activated to cause gripper fingers 52P to grip intermediate product 46A. Gripper fingers 52P and gripper fingers 52Q are turned to cause base material 42B gripped by gripper fingers 52Q to be mounted on first headstock 111. Robot arm 31 is withdrawn into external area 205.

Figure 38:
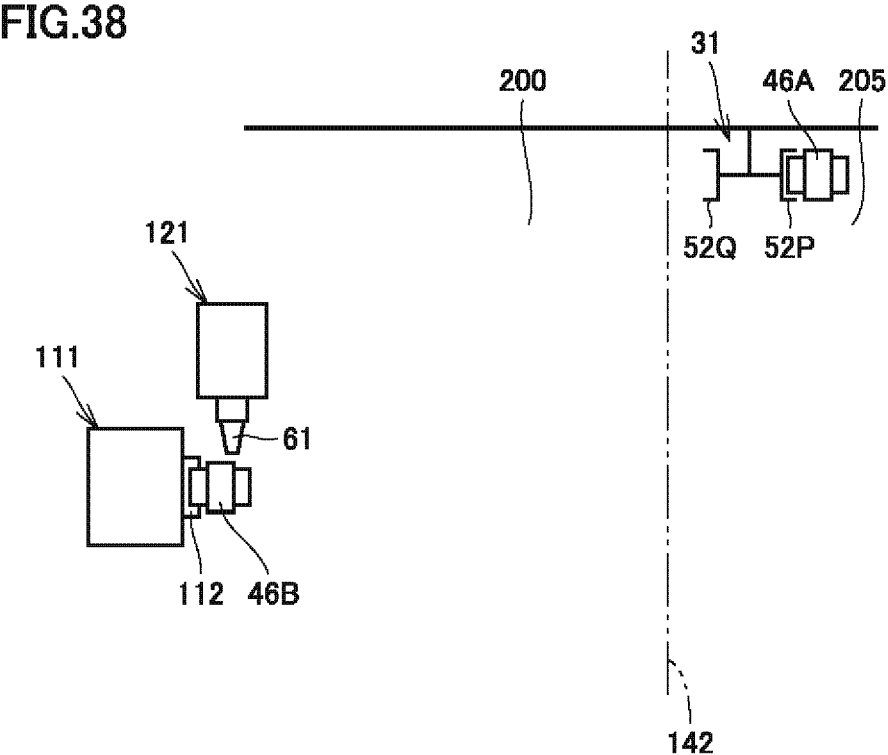
FIG. 38 is a diagram schematically showing a fourth step of the workpiece processing method in the fourth embodiment of the present invention.

Referring to FIG. 38, tool spindle 121 is then caused to approach base material 42B mounted on first headstock 111. Additive manufacturing is performed with additive manufacturing head 61 to produce an intermediate product 46B. During this additive manufacturing, intermediate product 46A gripped by gripper fingers 52P of robot arm 31 is cooled.

Figure 39:
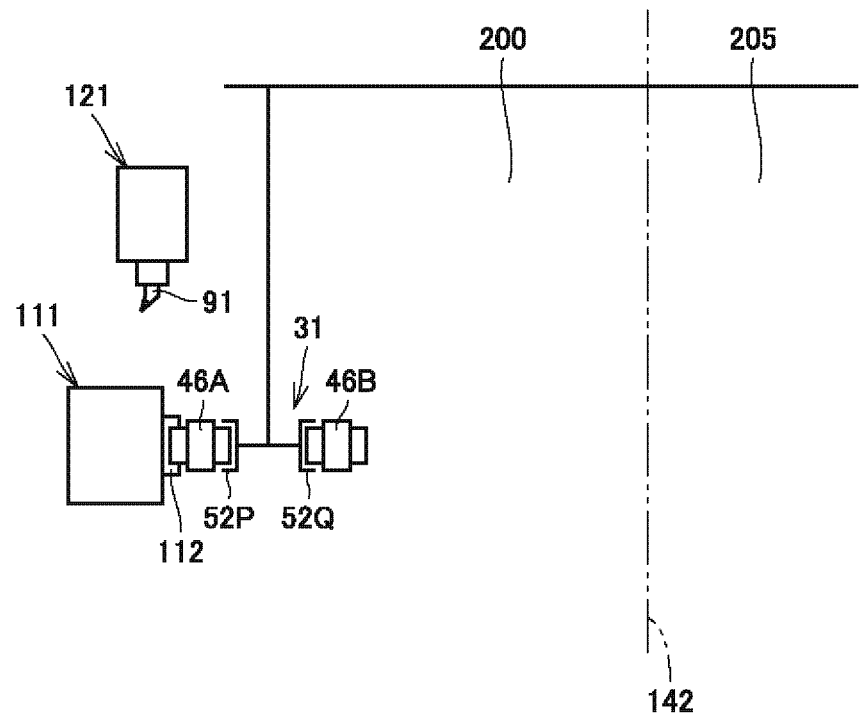
FIG. 39 is a diagram schematically showing a fifth step of the workpiece processing method in the fourth embodiment of the present invention.

Referring to FIG. 39, robot arm 31 is then activated to cause gripper fingers 52Q to grip intermediate product 46B. Gripper fingers 52P and gripper fingers 52Q are tuned to cause intermediate product 46A gripped by gripper fingers 52P to be mounted on first headstock 111. Robot arm 31 is withdrawn into external area 205. Instead of additive manufacturing head 61, tool 91 is attached to tool spindle 121.

Figure 40:
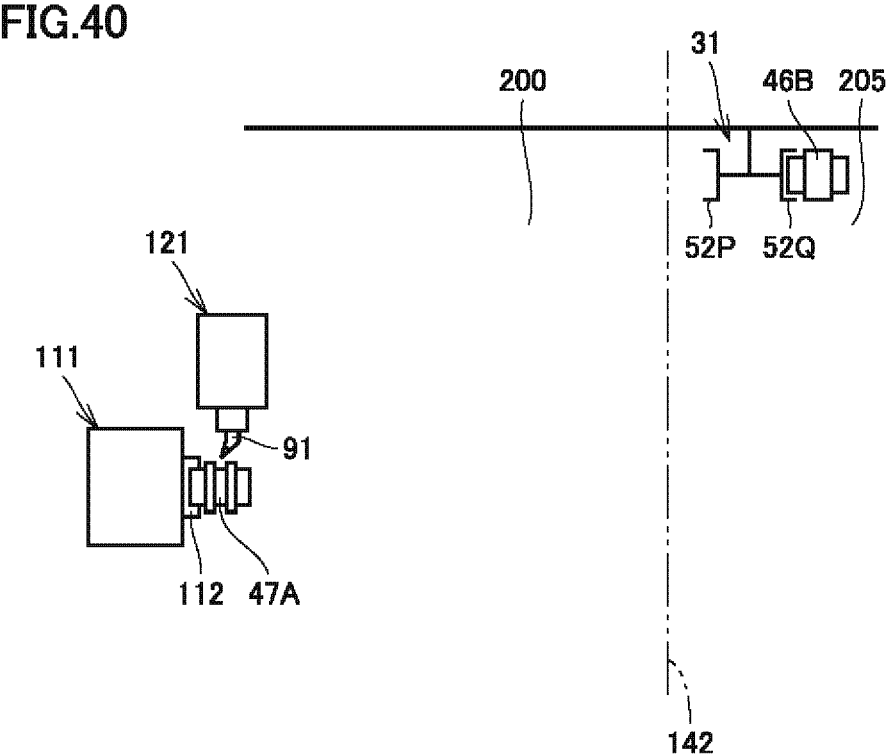
FIG. 40 is a diagram schematically showing a sixth step of the workpiece processing method in the fourth embodiment of the present invention.

Referring to FIG. 40, tool spindle 121 is caused to approach intermediate product 46A mounted on first headstock 111. Subtractive manufacturing is performed with tool 91 to produce a final product 47A. Intermediate product 46B gripped by gripper fingers 52Q of robot arm 31 is cooled.

Figure 41:
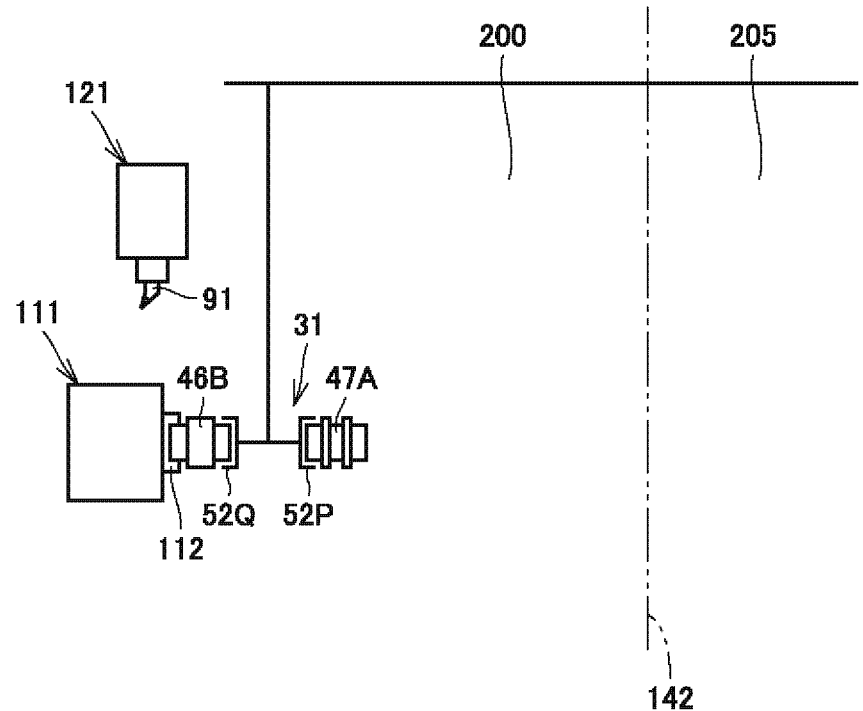
FIG. 41 is a diagram schematically showing a seventh step of the workpiece processing method in the fourth embodiment of the present invention.

Referring to FIG. 41, robot arm 31 is then activated to cause gripper fingers 52P to grip final product 47A. Gripper fingers 52P and gripper fingers 52Q are turned to cause intermediate product 46B gripped by gripper fingers 52Q to be mounted on first headstock 111. Final product 47A gripped by gripper fingers 52Q is withdrawn into external area 205.

Figure 42:
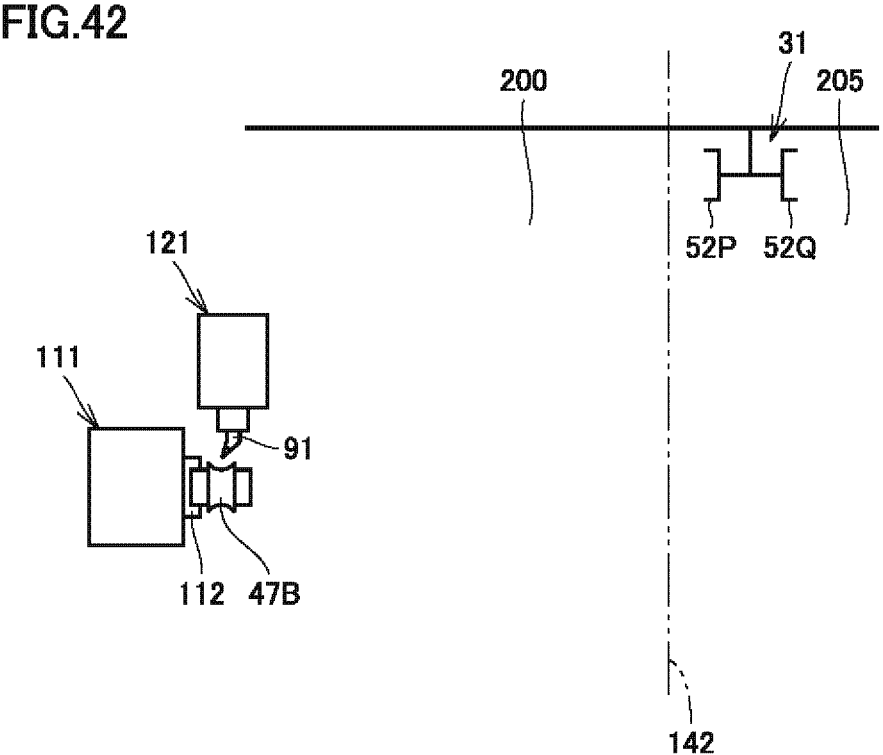
FIG. 42 is a diagram schematically showing an eighth step of the workpiece processing method in the fourth embodiment of the present invention.
Figure 43:
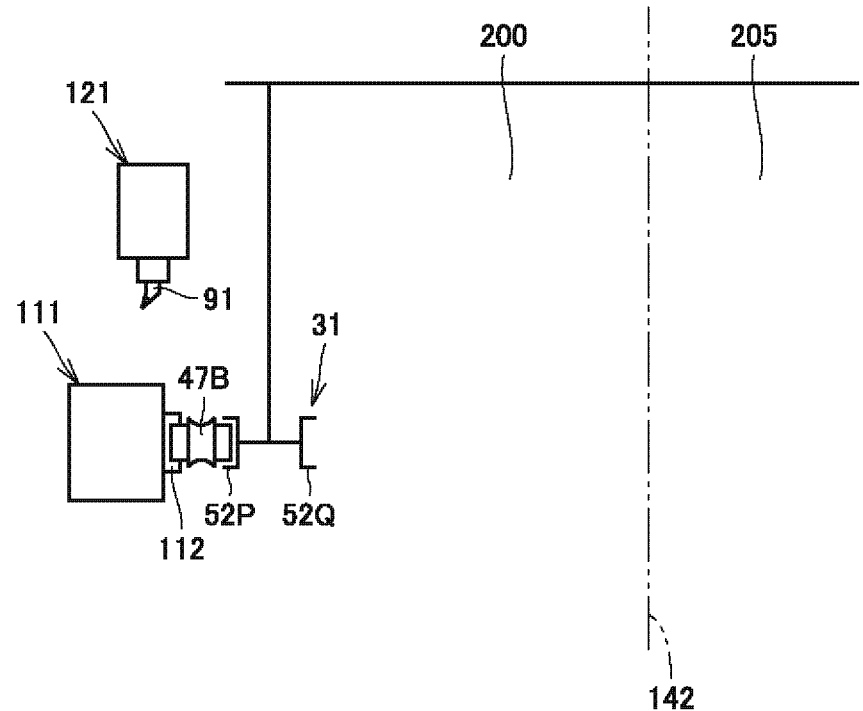
FIG. 43 is a diagram schematically showing a ninth step of the workpiece processing method in the fourth embodiment of the present invention.

Referring to FIG. 42, tool spindle 121 is then caused to approach intermediate product 46B mounted on first headstock 111. Subtractive manufacturing is performed with tool 91 to produce a final product 47B. Referring to FIG. 43, robot arm 31 is then activated to cause gripper fingers 52P to grip final product 47B. Final product 47B gripped by gripper fingers 52P is withdrawn into external area 205.

In accordance with the workpiece processing method in the present embodiment, the step of cooling an intermediate product 46 is performed while this intermediate product 46 is gripped by gripper fingers 52 of robot arm 31.

The workpiece processing method in the fourth embodiment of the present invention configured in this manner can produce the effects described above in connection with the first embodiment as well.

Fifth Embodiment

FIGS. 44 to 48 are each a diagram schematically showing a step in a workpiece processing method in a fifth embodiment of the present invention.

Referring to FIGS. 44 to 48, a manufacturing machine used for the workpiece processing method in the present embodiment includes a first headstock 111, a tool spindle 121, a second headstock 116, and an additive manufacturing head 61. In the present embodiment, additive manufacturing head 61 used for additive manufacturing and a tool 91 used for subtractive manufacturing are selectively attached to tool spindle 121.

Figure 44:
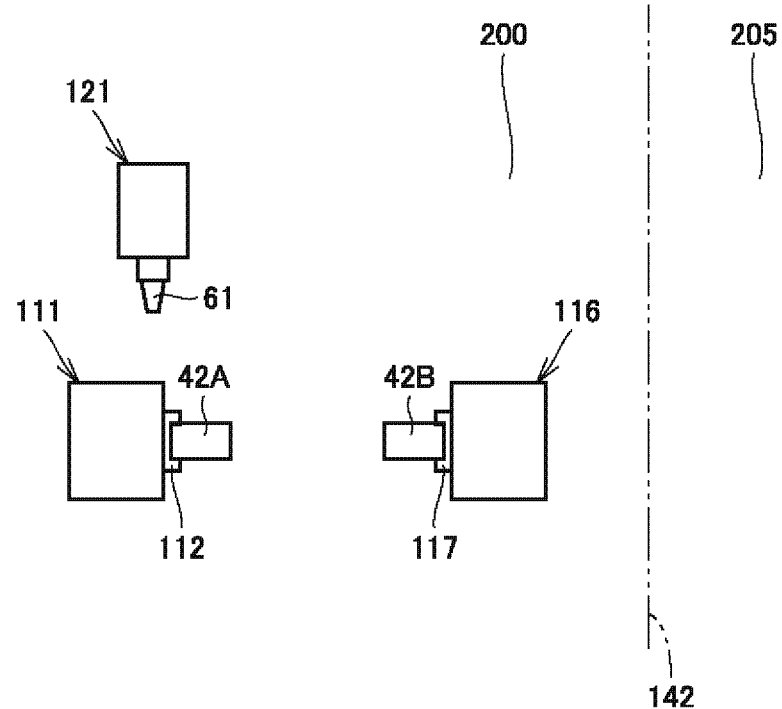
FIG. 44 is a diagram schematically showing a first step of a workpiece processing method in a fifth embodiment of the present invention.

Referring to FIG. 44, in a machining area 200, a base material 42A is mounted on first headstock 111. A base material 42B is mounted on second headstock 116. Additive manufacturing head 61 is first attached to tool spindle 121.

Figure 45:
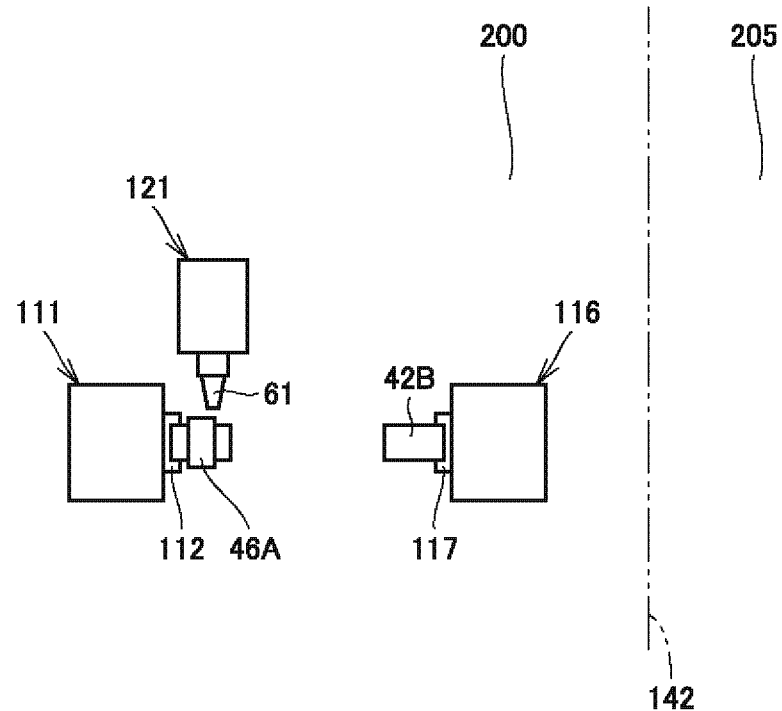
FIG. 45 is a diagram schematically showing a second step of the workpiece processing method in the fifth embodiment of the present invention.

Referring to FIG. 45, tool spindle 121 is then caused to approach base material 42A mounted on first headstock 111. Additive manufacturing is performed with additive manufacturing head 61 to produce an intermediate product 46A.

Figure 46:
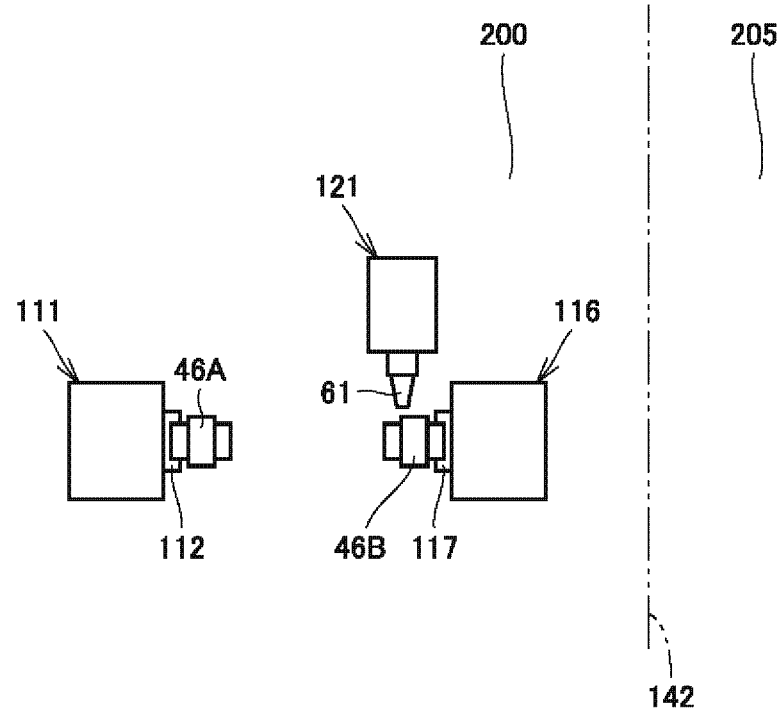
FIG. 46 is a diagram schematically showing a third step of the workpiece processing method in the fifth embodiment of the present invention.

Referring to FIG. 46, tool spindle 121 is then caused to approach base material 42B mounted on second headstock 116. Additive manufacturing is performed with additive manufacturing head 61 to produce an intermediate product 46B. During this additive manufacturing, intermediate product 46A mounted on first headstock 111 is cooled. Instead of additive manufacturing head 61, tool 91 is attached to tool spindle 121.

Figure 47:
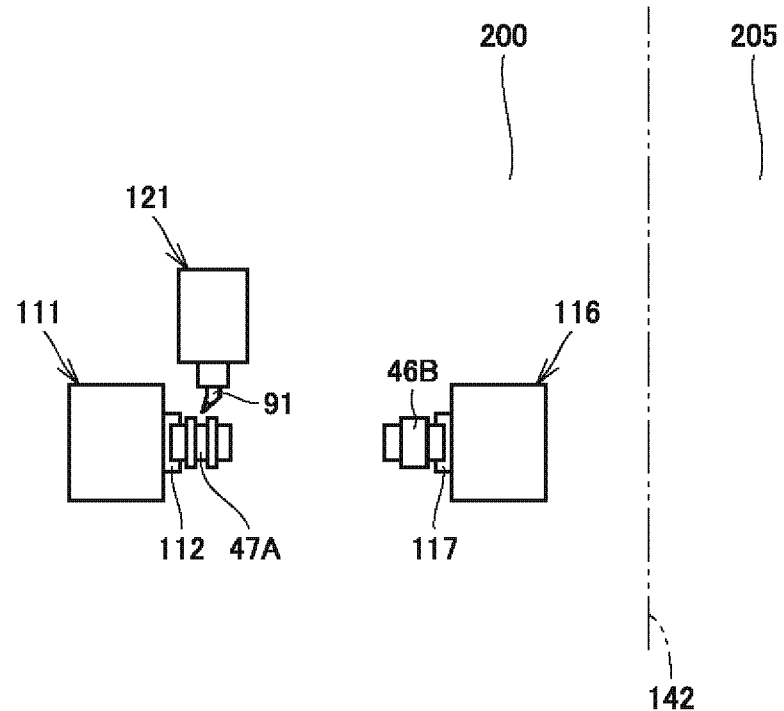
FIG. 47 is a diagram schematically showing a fourth step of the workpiece processing method in the fifth embodiment of the present invention.

Referring to FIG. 47, tool spindle 121 is then caused to approach intermediate product 46A mounted on first headstock 111. Subtractive manufacturing is performed with tool 91 to produce a final product 47A. During this subtractive manufacturing, intermediate product 46B mounted on second headstock 116 is cooled.

Figure 48:
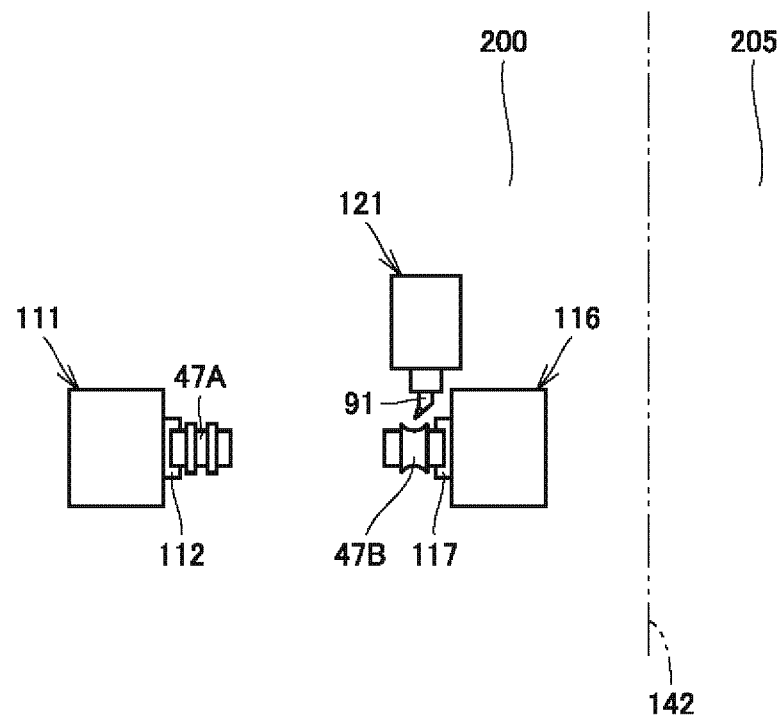
FIG. 48 is a diagram schematically showing a fifth step of the workpiece processing method in the fifth embodiment of the present invention.

Referring to FIG. 48, tool spindle 121 is then caused to approach intermediate product 46B mounted on second headstock 116. Subtractive manufacturing is performed with tool 91 to produce a final product 47B. Final product 47A and final product 47B are removed from first headstock 111 and second headstock 116, respectively.

In accordance with the workpiece processing method in the present embodiment, the same workpiece is kept mounted on first headstock 111 and the same workpiece is kept mounted on second headstock 116 while the additive manufacturing and the subtractive manufacturing are performed to produce final products 47 from base materials 42. Accordingly, the time taken for transporting workpieces is unnecessary, which enables improvement of the productivity.

The workpiece processing method in the fifth embodiment of the present invention configured in this manner can produce the effects described above in connection with the first embodiment as well.

Regarding the above-described embodiments, all the workpieces are subjected to additive manufacturing and subtractive manufacturing. The workpiece processing method, however, is not limited to this, and may be applied to a process in which a workpiece (referred to as Workpiece A) is subjected to additive manufacturing and subtractive manufacturing and another workpiece (referred to as Workpiece B) is subjected to only subtractive manufacturing. In this case, with Workpiece A having been subjected to additive manufacturing kept on stand by, Workpiece B can be subjected to subtractive manufacturing to improve the productivity of the process of successively processing a plurality of workpieces.

A workpiece processing method according to the present invention is a method for successively processing a plurality of workpieces including a first workpiece and a second workpiece in a single machining area. The workpiece processing method includes: performing additive manufacturing on the second workpiece in the machining area; and performing subtractive manufacturing on the first workpiece in the machining area while keeping on standby the second workpiece on which additive manufacturing is performed.

In accordance with the workpiece processing method configured in this manner, the second workpiece having been subjected to additive manufacturing is kept on standby and, in parallel with this, subtractive manufacturing is performed on the first workpiece, which enables improvement of the productivity of the process of successively processing a plurality of workpieces.

Preferably, the performing of additive manufacturing on the second workpiece includes performing additive manufacturing on the second workpiece while keeping on standby the first workpiece on which additive manufacturing is performed.

In accordance with the workpiece processing method configured in this manner, a workpiece is kept on standby and, in parallel with this, additive manufacturing/subtractive manufacturing is performed on a workpiece, which enables improvement of the productivity of the process of successively processing a plurality of workpieces.

Preferably, the workpiece processing method further includes: performing additive manufacturing on a third workpiece in the machining area while keeping the second workpiece on standby, after the performing of subtractive manufacturing on the first workpiece; and performing subtractive manufacturing on the second workpiece in the machining area while keeping on standby the third workpiece on which additive manufacturing is performed.

In accordance with the workpiece processing method configured in this manner, the productivity of the process of successively processing the first workpiece, the second workpiece, and the third workpiece by means of additive manufacturing and subtractive manufacturing can be improved.

Preferably, the workpiece processing method further includes: performing additive manufacturing on the first workpiece in the machining area before the performing of additive manufacturing on the second workpiece; and performing subtractive manufacturing on the second workpiece in the machining area after the performing of subtractive manufacturing on the first workpiece.

In accordance with the workpiece processing method configured in this manner, the productivity of the process of successively processing the first workpiece and the second workpiece by means of additive manufacturing and subtractive manufacturing can be improved.

Preferably, a manufacturing machine forming the machining area includes a first workpiece holder and a second workpiece holder capable of holding a workpiece. In accordance with the workpiece processing method, during the performing of additive manufacturing on the second workpiece and during the performing of subtractive manufacturing on the first workpiece, the first workpiece holder holds the first workpiece and the second workpiece holder holds the second workpiece.

In accordance with the workpiece processing method configured in this manner, it is unnecessary to transport the workpieces between additive manufacturing performed on the second workpiece and subtractive manufacturing performed on the first workpiece, which enables improvement of the productivity of the workpiece processing.

Preferably, the first workpiece holder and the second workpiece holder are mounted on respective spindles configured to hold and rotate a workpiece.

In accordance with the workpiece processing method configured in this manner, the above-described effects can be produced by the workpiece processing for which a spindle is used for mounting the first workpiece holder and the second workpiece holder on the spindle.

Preferably, a manufacturing machine forming the machining area includes: a workpiece holder disposed in the machining area and configured to hold a workpiece; and a workpiece transporter including a plurality of grippers capable of gripping a workpiece and configured to transport a workpiece held by the workpiece holder. During the performing of additive manufacturing on the second workpiece, the workpiece holder holds the second workpiece and one of the grippers grips the first workpiece. The workpiece processing method further includes replacing, by the workpiece transporter, the second workpiece held by the workpiece holder with the first workpiece gripped by the one of the grippers, subsequent to the performing of additive manufacturing on the second workpiece and prior to the performing of subtractive manufacturing on the first workpiece. During the performing of subtractive manufacturing on the first workpiece, the workpiece holder holds the first workpiece and another one of the grippers grips the second workpiece.

In accordance with the workpiece processing method configured in this manner, the first workpiece gripped by the gripper of the workpiece transporter is kept on standby during the performing of additive manufacturing on the second workpiece, and the second workpiece gripped by the gripper of the workpiece transporter is kept on standby during the performing of subtractive manufacturing on the first workpiece.

Preferably, the workpiece holder is mounted on a spindle configured to hold and rotate a workpiece.

In accordance with the workpiece processing method configured in this manner, the above-described effects can be produced by the workpiece processing for which a spindle is used for mounting the workpiece holder on the spindle.

Preferably, a manufacturing machine forming the machining area includes: a first workpiece holder and a second workpiece holder disposed in the machining area and capable of holding a workpiece; and a workpiece transporter configured to transport a workpiece held by the first workpiece holder and a workpiece held by the second workpiece holder. During the performing of additive manufacturing on the second workpiece, the first workpiece holder holds the second workpiece and the second workpiece holder holds the first workpiece. The workpiece processing method further includes replacing, by the workpiece transporter, the second workpiece held by the first workpiece holder with the first workpiece held by the second workpiece holder, subsequent to the performing of additive manufacturing on the second workpiece and prior to the performing of subtractive manufacturing on the first workpiece. During the performing of subtractive manufacturing on the first workpiece, the first workpiece holder holds the first workpiece and the second workpiece holder holds the second workpiece.

In accordance with the workpiece processing method configured in this manner, the first workpiece held by the second workpiece holder is kept on standby during the performing of additive manufacturing on the second workpiece, and the second workpiece held by the second workpiece holder is kept on standby during the performing of subtractive manufacturing on the first workpiece.

Preferably, the first workpiece holder is mounted on a spindle configured to hold and rotate a workpiece, and the second workpiece holder is mounted on a tool rest configured to hold a tool.

In accordance with the workpiece processing method configured in this manner, the above-described effects can be produced by the workpiece processing in which the spindle is used for mounting the first workpiece holder on the spindle, and the tool rest is used for mounting the second workpiece holder on the tool spindle.

Preferably, a manufacturing machine forming the machining area includes: a first workpiece holder disposed in the machining area and capable of holding a workpiece; and a second workpiece holder and a third workpiece holder mounted on a tool rest configured to hold a tool and capable of holding a workpiece. The workpiece processing method further includes: performing additive manufacturing on the first workpiece in the machining area prior to the performing of additive manufacturing on the second workpiece; and performing subtractive manufacturing on the second workpiece in the machining area subsequent to the performing of subtractive manufacturing on the first workpiece. During the performing of additive manufacturing on the first workpiece and during the performing of additive manufacturing on the second workpiece, the second workpiece holder holds the first workpiece and the third workpiece holder holds the second workpiece. During the performing of subtractive manufacturing on the first workpiece, the first workpiece holder holds the first workpiece. During the performing of subtractive manufacturing on the second workpiece, the first workpiece holder holds the second workpiece. The workpiece processing method further includes holding a third workpiece and a fourth workpiece by the second workpiece holder and the third workpiece holder, respectively, until the performing of subtractive manufacturing on the second workpiece is completed.

In accordance with the workpiece processing method configured in this manner, the productivity can be improved in the process of successively processing the first, second, third, and fourth workpieces by means of additive manufacturing and subtractive manufacturing.

Preferably, the performing of additive manufacturing on the second workpiece includes discharging material powder and simultaneously applying energy to the discharged material powder to melt the material powder and form the second workpiece.

In accordance with the workpiece processing method configured in this manner, cooling of the second workpiece having been subjected to additive manufacturing and subtractive manufacturing on the first workpiece are performed in parallel, which enables improvement of the productivity of the process of successively processing a plurality of workpieces.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is mainly applied to a workpiece processing method for which additive manufacturing and subtractive manufacturing are used.

REFERENCE SIGNS LIST 21 movement mechanism; 22 linear guide; 23 base member; 24 support pillar; 25 rack and pinion; 31 robot arm; 31A position inside machining area; 31B position outside machining area; 32 base; 33 arm; 33L first movable unit; 33M second movable unit; 33N third movable unit; 36, 54, 63 coupling part; 41 workpiece; 42, 42A, 42B, 42C, 42D base material; 43 cladding portion; 44 threaded portion; 46, 46A, 46B, 46C, 46D intermediate product; 47, 47A, 47B final product; 51 workpiece gripper; 52, 52P, 52Q gripper finger; 53 base part; 61 additive manufacturing head; 62 main body; 64 connecting part; 65 laser beam emission part; 66 opening; 68 optical element; 70 material powder feeder; 71 mixing unit; 72 material powder tank; 73 tube member; 76 laser oscillator; 91 tool; 92, 92R, 92S workpiece holder; 100 manufacturing machine; 111 first headstock; 112, 117 spindle; 116 second headstock; 121 tool spindle; 131 lower tool rest; 132 swivel unit; 141 bed; 142 side cover; 143 shutter; 156 stocker; 200 machining area; 201, 202, 203, 204 central axis; 205 external area; 211, 212, 213 pivot axis; 214, 215, 216 rotation axis; 311 laser beam; 312 material powder; 313 gas; 314 melt spot; 315 cladding material; 316 cladding layer

The invention claimed is:

1. A workpiece processing method for successively processing a plurality of workpieces including a first workpiece and a second workpiece in a single machining area, the workpiece processing method comprising:
performing additive manufacturing on the second workpiece in the single machining area; and
performing subtractive manufacturing on the first workpiece in the single machining area while keeping on standby, outside of the single machining area, the second workpiece on which additive manufacturing has been performed.

2. The workpiece processing method according to claim 1, wherein
the performing of additive manufacturing on the second workpiece includes performing additive manufacturing on the second workpiece while keeping on standby the first workpiece on which additive manufacturing has been performed.

3. The workpiece processing method according to claim 2, further comprising:
performing additive manufacturing on a third workpiece in the single machining area while keeping the second workpiece on standby, after the performing of subtractive manufacturing on the first workpiece; and
performing subtractive manufacturing on the second workpiece in the single machining area while keeping on standby the third workpiece on which additive manufacturing has been performed.

4. The workpiece processing method according to claim 2, further comprising:
performing additive manufacturing on the first workpiece in the single machining area before the performing of additive manufacturing on the second workpiece; and
performing subtractive manufacturing on the second workpiece in the single machining area after the performing of subtractive manufacturing on the first workpiece.

5. The workpiece processing method according to claim 2, wherein
a manufacturing machine forming the single machining area includes a first workpiece holder and a second workpiece holder capable of holding a workpiece, and
during the performing of additive manufacturing on the second workpiece and during the performing of subtractive manufacturing on the first workpiece, the first workpiece holder holds the first workpiece and the second workpiece holder holds the second workpiece.

6. The workpiece processing method according to claim 5, wherein
the first workpiece holder and the second workpiece holder are mounted on respective spindles configured to hold and rotate a workpiece.

7. The workpiece processing method according to claim 2, wherein the single machining area is provided in a manufacturing machine comprising: a workpiece holder disposed in the single machining area and configured to hold a workpiece; and a workpiece transporter including a plurality of grippers capable of gripping a workpiece and configured to transport a workpiece held by the workpiece holder, and wherein
during the performing of additive manufacturing on the second workpiece, the workpiece holder holds the second workpiece and one of the grippers grips the first workpiece,
the workpiece processing method further comprises replacing, by the workpiece transporter, the second workpiece held by the workpiece holder with the first workpiece gripped by the one of the grippers, subsequent to the performing of additive manufacturing on the second workpiece and prior to the performing of subtractive manufacturing on the first workpiece, and
during the performing of subtractive manufacturing on the first workpiece, the workpiece holder holds the first workpiece and another one of the grippers grips the second workpiece.

8. The workpiece processing method according to claim 7, wherein
the workpiece holder is mounted on a spindle configured to hold and rotate a workpiece.

9. The workpiece processing method according to claim 2, wherein the single machining area is provided in a manufacturing machine comprising: a first workpiece holder and a second workpiece holder disposed in the single machining area and capable of holding a workpiece; and a workpiece transporter configured to transport a workpiece held by the first workpiece holder and a workpiece held by the second workpiece holder, and wherein
during the performing of additive manufacturing on the second workpiece, the first workpiece holder holds the second workpiece and the second workpiece holder holds the first workpiece,
the workpiece processing method further comprises exchanging, by the workpiece transporter, the second workpiece held by the first workpiece holder with the first workpiece held by the second workpiece holder, subsequent to the performing of additive manufacturing on the second workpiece and prior to the performing of subtractive manufacturing on the first workpiece, and
during the performing of subtractive manufacturing on the first workpiece, the first workpiece holder holds the first workpiece and the second workpiece holder holds the second workpiece.

10. The workpiece processing method according to claim 9, wherein
the first workpiece holder is mounted on a spindle configured to hold and rotate a workpiece, and
the second workpiece holder is mounted on a tool rest configured to hold a tool.

11. The workpiece processing method according to claim 2, wherein the single machining area is provided in a manufacturing machine comprising: a first workpiece holder disposed in the single machining area and capable of holding a workpiece; and a second workpiece holder and a third workpiece holder mounted on a tool rest configured to hold a tool and capable of holding a workpiece, and wherein
the workpiece processing method further comprises:
performing additive manufacturing on the first workpiece in the single machining area prior to the performing of additive manufacturing on the second workpiece; and
performing subtractive manufacturing on the second workpiece in the single machining area subsequent to the performing of subtractive manufacturing on the first workpiece,
during the performing of additive manufacturing on the first workpiece and during the performing of additive manufacturing on the second workpiece, the second workpiece holder holds the first workpiece and the third workpiece holder holds the second workpiece,
during the performing of subtractive manufacturing on the first workpiece, the first workpiece holder holds the first workpiece,
during the performing of subtractive manufacturing on the second workpiece, the first workpiece holder holds the second workpiece, and
the workpiece processing method further comprises holding a third workpiece and a fourth workpiece by the second workpiece holder and the third workpiece holder, respectively, until the performing of subtractive manufacturing on the second workpiece is completed.

12. The workpiece processing method according to claim 1, wherein
the performing of additive manufacturing on the second workpiece includes discharging material powder and simultaneously applying energy to the discharged material powder to melt the discharged material powder and form the second workpiece.

* * * * *